United States Patent
Tomofuji

(10) Patent No.: US 6,600,584 B2
(45) Date of Patent: *Jul. 29, 2003

(54) MULTIPLEX OPTICAL COMMUNICATION SYSTEM

(75) Inventor: Hiroaki Tomofuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/988,963

(22) Filed: Nov. 19, 2001

(65) Prior Publication Data

US 2002/0030876 A1 Mar. 14, 2002

Related U.S. Application Data

(60) Continuation of application No. 09/090,823, filed on Jun. 3, 1998, which is a division of application No. 08/587,390, filed on Jan. 17, 1996, now Pat. No. 5,805,322.

(30) Foreign Application Priority Data

Jan. 19, 1995 (JP) .................................. 7-6141

(51) Int. Cl.[7] ........................ H04B 10/02; H04B 10/16; H04B 10/12
(52) U.S. Cl. ........................ 359/177; 359/174; 359/176; 359/179; 359/341.3; 359/341.41; 359/341.42
(58) Field of Search ............................... 351/174, 176, 351/177, 179, 341.41, 341.42, 337.13, 341.3

(56) References Cited

U.S. PATENT DOCUMENTS

| | | | |
|---|---|---|---|
| 4,366,565 A | 12/1982 | Herskowitz | |
| 5,035,481 A | 7/1991 | Mollenauer | |
| 5,268,786 A | 12/1993 | Matsushita et al. | |
| 5,274,496 A | * 12/1993 | Fujiwara et al. | ............ 359/177 |
| 5,276,543 A | 1/1994 | Olshansky | |
| 5,296,957 A | * 3/1994 | Takahashi et al. | .......... 359/177 |
| 5,396,360 A | 3/1995 | Majima | |
| 5,463,487 A | * 10/1995 | Epworth | ..................... 359/124 |
| 5,500,756 A | 3/1996 | Tsushima et al. | |
| 5,535,037 A | 7/1996 | Yoneyama | |
| 5,664,131 A | 9/1997 | Sugiya | |
| 5,764,404 A | 6/1998 | Yamane et al. | |
| 5,796,505 A | 8/1998 | Ushirozawa | |
| 5,966,237 A | 10/1999 | Sugaya et al. | |

FOREIGN PATENT DOCUMENTS

| | | |
|---|---|---|
| EP | 0305995 | 3/1989 |
| EP | 0 408 905 | 1/1991 |
| EP | 0 543 570 | 5/1993 |
| EP | 0 552 937 | 7/1993 |
| EP | 0617527 | 9/1994 |
| GB | 2 242 091 | 9/1991 |
| GB | 2 268 852 | 1/1994 |
| GB | 2280561 | 1/1995 |
| GB | 2 280 561 | 2/1995 |
| GB | 2 294 170 | 4/1996 |

\* cited by examiner

*Primary Examiner*—Jason Chan
*Assistant Examiner*—M. R. Sedighian
(74) *Attorney, Agent, or Firm*—Katten Muchin Zavis Rosenman

(57) ABSTRACT

A multiplex optical communication system transmitting a multiplex optical signal between terminal equipments each including converters producing optical signals combined to the multiplex optical signal, through repeater equipment including an optical amplifier, under controlling the amplifier so that when a converter is added or removed, a time constant of the amplifier is equal to a time constant of the added or removed converter, or the amplifier produces output under constant output level control before adding or removing the converter and after the amplifier produces final output and constant gain control during the added or removed converter increases or decreases output. The time constant control is performed to the amplifier by making the amplifier repeat start and stop of increasing or decreasing output step by step in accordance with prescribed objective values corresponding to half way output of the optical amplifier.

21 Claims, 16 Drawing Sheets

MULTIPLEX OPTICAL COMMUNICATION SYSTEM

CROSS-REFERENCES TO RELATED APPLICATIONS

This is a continuation of U.S. application Ser. No. 09/090,823, filed Jun. 3, 1998, which is a division of U.S. application Ser. No. 08/587,390, filed Jan. 17, 1996, now U.S. Pat. No. 5,805,322.

BACKGROUND OF THE INVENTION

FIELD OF THE INVENTION

The present invention relates to a multiplex optical communication system for transmitting multiplex optical signals under a signal transmission technology of Wavelength Division Multiplexing (WDM) or Optical Time Division Multiplexing (OTDM).

In particular, the present invention relates to optical amplifiers for amplifying power of the multiplex optical signals transmitted through the system.

FIG. 1A is a block diagram for illustrating the multiplex optical communication system of the related art, operating under the WDM or OTDM technology. The multiplex optical communication system is composed of optical signal terminating equipment (TERM EQUIP) (1 and 1') placed at both terminals of the OPT-TRANS LINE 3, for transmitting and receiving the multiplex optical signals, an optical transmission line (OPT-TRANS LINE) (3) made of an optical fiber depicted by a thick line, for transmitting the multiplex optical signal, and optical amplifier repeater equipment (OAMP REP EQUIP) (2) placed along the OPT-TRANS LINE 3, for amplifying and repeating the multiplex optical signals transmitting between the TERM EQUIP 1 and 1'.

The TERM EQUIP 1 includes a transmitting unit (TX-UNIT) (1001) for transmitting a multiplex optical signal to the TERM EQUIP 1' and a receiving unit (RX-UNIT) (1002) for receiving a multiplex optical signal transmitted from TERM EQUIP 1'. The same as TERM EQUIP 1, the TERM EQUIP 1' includes TX-UNIT 1001' and RX-UNIT 1002'. The TERM EQUIP 1 and TERM EQUIP 1' have the same constitution and function, so that the TERM EQUIP 1 will be representatively described hereinafter. The OAMP REP EQUIP 2 includes two repeater optical amplifiers (REP OPT-AMPs) (8 and 8'). The REP OPT-AMP 8 is to amplify the multiplex optical signal transmitted from the TX-UNIT 1001 in the TERM EQUIP 1, for repeating the multiplex optical signal to RX-UNIT 1002' in the TERM EQUIP 1', and the REPOPT-AMP 8' is to amplify the multiplex optical signal transmitted from the TX-UNIT 1001' in the TERM EQUIP 1', for repeating the multiplex optical signal to RX-UNIT 1002 in TERM EQUIP 1. When a distance between TERM EQUIP 1 and 1' is long, a plurality of the OAMP REP EQUIP 2 are placed. However, one OAMP REP EQUIP 2 is representatively depicted in FIG. 1A.

FIG. 1B shows a block diagram of the TX-UNIT 1001 of the related art. The TX-UNIT 1001 consists of electro-optical signal converter (ELEC-OPT CONV) (4) connected with electrical signal channel lines (ELEC-SIG CHANNEL LINEs) (9) through which a plurality of electrical signals formed to channels are sent to the ELEC-OPT CONV 4, an optical signal combiner (OPT-SIG COMB) (5) connected with the ELEC-OPT CONV 4 through optical fibers depicted by thick lines, and a transmitting unit optical amplifier (TX-UNIT OPT-AMP)(6) connected with the OPT-SIG COMB 5 through an optical fiber depicted by a thick line. The ELEC-OPT CONV 4 is for converting the electrical signals to optical signals at every channel. The ELEC-OPT CONV 4 consists of converters 4-1, 4-2, - - - and 4-n in correspondence with the ELEC-SIG CHANNEL LINEs 9. When the electrical signals are fed to the ELEC-OPT CONV 4 through the ELEC-SIG CHANNEL LINEs 9, the converters 4-1, 4-2, - - - and 4-n convert the electrical signals to optical signals and send the optical signals to the OPT-SIG COMB 5, respectively. The OPT-SIG COMB 5 is for combining the optical signals sent from the ELEC-OPT CONV 4, adopting the WDM technology or the OTDM technology, so as to produce a multiplex optical signal. The TX-UNITOPT-AMP 6 is for amplifying the power of the multiplex optical signal sent from the OPT-SIG COMB 5. The amplified multiplex optical signal is sent out from the TX-UNIT 1001 to the REP OPT-AMP 8 in OAMP REP EQUIP 2 through the OPT-TRANS LINE 3.

FIG. 1C shows a block diagram of the RX-UNIT 1002. The RX-UNIT 1002 consists of an optical signal branching unit (OPT-SIGBRANCH) (5') and optical-electro signal converters (OPT-ELEC CONVs) (4'). The OPT-SIG BRANCH 5' is connected with the OPT-TRANS LINE 3 depicted by a thick line, for optically demultiplexing the received multiplex optical signal to a plurality of received optical signals which are called "received demultiplexed optical signals" hereinafter. The received demultiplexed optical signals produced at the OPT-SIG BRANCH 5' are sent to the OPT-ELEC CONV 4' through optical fibers depicted by thick lines. The OPT-ELEC CONV 4' consists of converters 4'-1, 4'-2, - - - , 4'-n at which the received demultiplexed optical signals are converted to received electrical signals and sent out from RX-UNIT 1002 to the ELEC-SIG CHANNEL LINEs 9, respectively.

In FIG. 1A, the OAMP REP EQUIP 2 includes two optical amplifiers (8 and 8') which will be called REP OPT-AMPs 8 and 8' hereinafter. The REP OPT-AMP 8 and 8' are for amplifying the power of multiplex optical signals received from TERM EQUIP 1 and 1', respectively. By virtue of the REP OPT-AMPs 8 and 8', power loss, caused by the OPT-TRANS LINE 3, of the multiplex optical signals transmitting between TERM EQUIP 1 and 1' are recovered. Therefore, when a length of the OPT-TRANS LINE 3 between TERM EQUIP 1 and 1' is long, a plurality of the OAMP REP EQUIP 2 are placed along the OPT-TRANS LINE 3, and the number of the OAMP REP EQUIP 2 is determined by considering both the power loss due to the OPT-TRANS LINE 3 and the power amplification factors of REP OPT-AMPs 8 and 8' in OAMP REP EQUIP 2, so that the multiplex optical signals can be transmitted between the TERM EQUIP 1 and 1' in high fidelity and a high signal to noise ratio (SNR).

Generally, there are two kinds of optical amplifiers, a semiconductor amplifier and an optical fiber amplifier. The both kinds of optical amplifiers can be applied to the TX-UNIT OPT-AMP 6 in FIG. 1B and the REP OPT-AMPs 8 and 8' in FIG. 1A. For example, in case the TX-UNIT OPT-AMP 6 is the semiconductor amplifier, the multiplex optical signal fed to the TX-UNIT OPT-AMP 6 is amplified by a semiconductor device operating under DC supply current, and in case the TX-UNIT OPT-AMP 6 is the optical fiber amplifier, the multiplex optical signal fed to the TX-UNIT OPT-AMP 6 is amplified in an optically amplifying technology using an induced emission.

Recently, the optical fiber amplifier is used to the TX-UNIT OPT-AMP 6 and the REP OPT-AMP 8 mostly. Because, the optical fiber amplifier has features such as a low Noise Figure, a little non-linearity in amplification, a low connection loss with the OPT-TRANSLINE 3, high capability of a power amplification and a high stability against a temperature change. The optical fiber amplifier is composed of a rare earth metal-doped optical fiber such as Erbium (Er)-doped optical fiber and a pump light source such as a semiconductor laser.

In the multiplex optical communication system of the related art, the output power of the multiplex optical signal from the TX-UNITOPT AMP 6 or the REP OPT-AMP 8 is controlled so as to be always constant in level under constant output level control performed in the TX-UNIT OPT AMP 6 and the REP OPT-AMP 8 respectively. In case of the REP OPT-AMP 8, by virtue of the constant output level control, the OAMP REP EQUIP 2 can be placed independently on a length of the OPT-TRANS LINE 3 connected with the OAMPREP EQUIP 2. In other words, the power level of each section between REP OPT-AMPs or between TERM EQUIP and REP OPT-AMPs is independent. The change of power level and different of OPT-TRANS LINE 3 loss at one section don't affect the power level at next section.

If a multiplex optical signal includes "n" channels and the TX-UNIT OPT-AMP 6 is required to produce at least output power "$P_o$" per a channel for obtaining an advisable SNR, the TX-UNIT OPT AMP 6 must be designed so as to produce output power of "$P_o \times n$". In other words, the TX-UNIT OPT AMP 6 initially produces the optical output under the constant output level control so that the output power of the TX-UNIT OPT AMP 6 corresponds to the number of the channels of a multiplex optical signal to be initially amplified by the TX-UNIT OPT AMP 6.

From a viewpoint of the operational flexibility of the multiplex optical communication system, it is desirable that the channels of the multiplex optical signal can be changed easily in response to trouble about the transmission of the multiplex optical signal and up grade of traffic capacity. For example, at first some channels which meet demand are used. When more traffic capacity are needed, other channels will become used. Usually, the multiplex optical communication system provides at least one spare channel in place of a fallen channel. For example, when a module of a channel has trouble, another module of the spare channel is used instead of the troubled module. Such previous provision of the spare channel is effective for increasing the operational reliability of the multiplex optical communication system. However, when the spare channel is used, there has been a problem of the output power in the multiplex optical communication system of the related art.

In the multiplex optical communication system of the related art, the constant output level control is performed to optical amplifier so as to keep the total output of the multiplex optical signal constant. As a result, when the number of the channels decreases by removing a CONV which will be called "removed CONV" hereinafter, single output of each channel increases. On the contrary, when the number of the channels increases by adding a CONV which will be called "added CONV" hereinafter, the single output of each channel decreases.

When output power of a channel of the multiplex optical signal changes thus, a problem due to a non-linear effect occurs on the optical fiber of the OPT-TRANS LINE 3. That is, when the power of a channel exceeds a specific level, a waveform of each channel is distorted by the non-linear effect on the optical fiber. The non-linear effect is generally called a self phase modulation effect. Meanwhile, in contradiction to the above, the power of the optical signal is required to be larger than a specific level for maintaining a required SNR at the receiving unit such as the RX-UNIT 1002 or 1002'.

In the REP OPT-AMP 8, minimum input power and maximum output power are required for performing the reception and the transmission of the multiplex optical signal safely. When there are a plurality of the REP OPT-AMPs 8 in the multiplex optical communication system, these minimum input power and maximum output power are determined by the reception and amplification ability of each REP OPT-AMP 8 and the number of the REP OPT-AMPs 8. In each REP OPT-AMP 8, a level difference between the minimum input power and the maximum output power is called a transmission and reception level difference. The REP OPT-AMP 8 is designed so that the transmission and reception level difference is larger than a signal loss caused by the OPT-TRANS LINE 3 lying between the OAMP REP EQUIP 2. Furthermore, in the design of the REP OPT-AMP 8, a margin of output power of each channel is afforded to insure its level difference caused by increase or decrease of the number of the channels in the multiplex optical signal. Because of allowing the margin thus, a share of the transmission and reception level difference to the optical transmission loss is decreased. In other words, a distance between the OAMP REP EQUIP 2 is shortened. This results in increasing the number of the OAMP REP EQUIP 2 uneconomically.

SUMMARY OF THE INVENTION

Therefore, an object of the present invention is to make the multiplex optical communication system have a large operational flexibility against the variation of the total number of the channels in the multiplex optical signal transmitted through the system.

Another object of the present invention is to increase the operational fidelity of the multiplex optical communication system.

Still another object of the present invention is to improve contradiction occurring in the system that increasing output power is required to maintain the required high SNR, however, the output power cannot be increase so high because the self phase modulation effect occurs in the system.

Further another object of the present invention is to decrease costs for constructing and maintaining the repeater equipment by decreasing the number of the repeater equipment.

The above objects are achieved by controlling the terminal equipment and the repeater equipment of the system so that output variation occurring at the terminal equipment is made equal to the output variation occurring at the repeater equipment. Wherein, the converter is provided in the terminal equipment for converting an electrical signal to an optical signal. The multiplex optical signal is formed by combining the converted optical signals produced at the converters in corresponding to a plurality of the electrical signals fed to the terminal equipment. The output variation is caused by changing the number of operating converters due to adding or removing a converter to or from the operating converters.

In order to make the optical output variations equal to each other, either of two ways is operated to the optical amplifier of the repeater equipment while the added converter is increasing output or the removed converter is decreasing output. One way is "to change the output power of the optical amplifier under the same time-constant as the output change of the converter" which is called "time constant control". Another way is "constant gain control" which is control for keeping gain of the optical amplifier constant.

First of all, "time constant control" will be explained.

The time constant at changing the target of output level of the optical amplifier is set as same as the time constant of the added converter or the removed converter, then the output power of each converter is kept constant even when converter is added or removed newly. Before adding or removing a converter, the terminal and the repeater equipment produce output under "constant output level control" which is for keeping output of the multiplex optical signal produced from the terminal and the repeater equipment, constant. When a converter is added or removed, the optical amplifier in the repeater equipment changes the target of the prescribed value under the same time constant as the output change of the converter. In order to perform changing the target of output level and announce the prescribed value, a monitor controller is provided to the terminal equipment for generating an optical output control signal to be sent to the optical amplifier in the repeater equipment.

When a converter is added or removed, the monitor controller monitors the output of the converters and prohibits that an added or removed converter starts to increase or decrease the output and sends the optical output control signal to the optical amplifier in the repeater equipment. After that, the monitor controller permits that the added or the removed converter starts to raise or decrease the output power. The optical amplifier receives the optical output control signal and starts to change the target of output level to the prescribed value which is information on the optical output control signal announced from the monitor controller.

The prescribed value is proportional to the number of the converters at the terminal equipment.

Next "constant gain control" will be explained. Before adding or removing the converter, the optical amplifier of the repeater equipment produces output under "constant output level control" which is for keeping output of the multiplex optical signal produced from the terminal and the repeater equipment, constant.

When a converter is added or removed, the monitor controller which monitors the number and the output power of converters, prohibits that the added or the removed converter starts increasing or decreasing output, and sends the optical output control signal to the optical amplifier. After that, the monitor controller permits the added or the removed converter starts increasing or decreasing the output power. Upon receiving the optical output control signal, the optical amplifier changes "constant output level control" to "constant gain control".

After the added or the removed converter finishes increasing or decreasing the output power, the control of the optical amplifier returns to the "constant output level control" from "constant gain control". However, at this time, a constant output level is different from the previous one, because it is a prescribed value determined by the number of the converters. This is announced to the optical amplifier by the optical output control signal.

This switching from "constant gain control" to "constant output level control" is performed by the optical output control signal or automatically, by no signal, after time, which is enough for the added or the removed converter to finish increasing or decreasing the output power, passed.

When the optical amplifier produces output under the time constant control, a delay occurs between the output from the added or removed converter and the output from the optical amplifier. The delay is shortened by using step-by-step time constant control which is performed by providing half way objective values in the monitor controller so that the added or the removed converter produces output step by step under the previously determined rising or falling time constant. Every time the added or removed converter starts and stops increasing or decreasing output, the optical output control signal including the start information is sent from the monitor controller to the optical amplifier. As a result, the optical amplifier repeats starting and stopping the increase or decrease of the output corresponding to the objective values. By virtue of the set-by-step control, the error due to the delay is reduced on an average.

The optical output control signal is transmitted between the terminal equipment and the repeater equipment through an optical transmission line connecting them.

The improvement described above is performed to the multiplex optical communication system operating under Wavelength Division Multiplexing (WDM) or Time Division Multiplexing (OTDM).

DESCRIPTION OF THE PREFERRED EMBODIMENTS

Figure 1A:
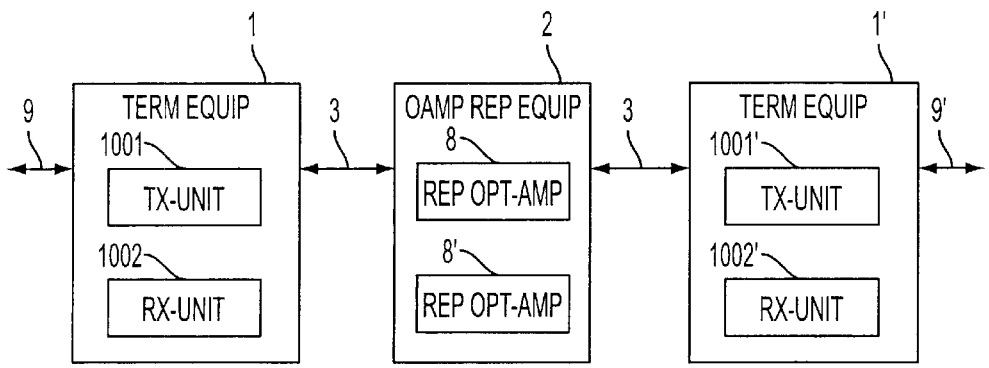
FIG. 1A is a block diagram of a multiplex optical communication system of the related art.
Figure 2:
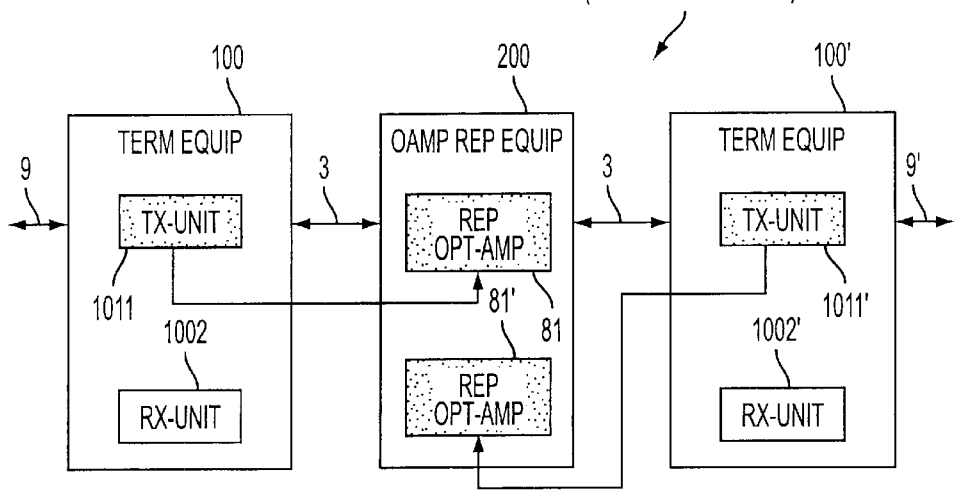
FIG. 2 is a block diagram of a multiplex optical communication system of the first embodiment of the present invention.

FIG. 2 is a block diagram for illustrating a multiplex optical communication system of a first embodiment of the present invention. In the first embodiment, the multiplex optical communication system transmits signals or data under the OTDM. In FIG. 2, the multiplex optical communication system principally consists of TERM EQUIP 100 and 100', OAMP REP EQUIP 200 and an OPT-TRANS LINE 3 depicted by a thick line. The TERM EQUIP 100 consists of a TX-UNIT 1011 and a RX-UNIT 1002, the TERM EQUIP 100' consists of a TX-UNIT1011' and an RX-UNIT 1002' and the OAMP REP EQUIP 200 includes REP OPT-AMPs 81 and 81'. In FIG. 2, the same reference symbol as in FIG. 1A designates the same unit as in FIG. 1A. There is a case where a plurality of OAMP REP EQUIP 200 are placed between the TERM EQUIP 100 and 100' along the OPT-TRANS LINE 3. However, only one OAMP REP EQUIP 200 is representatively depicted in FIG. 2. A multiplex optical signal transmitted from TX-UNIT 1011 (1011') is amplified by the REP OPT-AMP 81 (81') for repeating the multiplex optical signal to the RX-UNIT 1002' (1002). The present invention relates to optical amplifiers provided in a multiplex optical communication system, so that the present invention relates to TX-UNITs 1011 and 1011' and REP OPT-AMPs 81 and 81' as shown by blocks diagonally shaded in FIG. 2. However, the TX-UNITs 1011 and 1011', REP OPT-AMPs 81 and 81' have the same function and constitution respectively, so that in the present invention, the TX-UNIT 1011 and REP OPT-AMP 81 will be representatively described in reference with FIGS. 3 and 4.

Figure 1B:
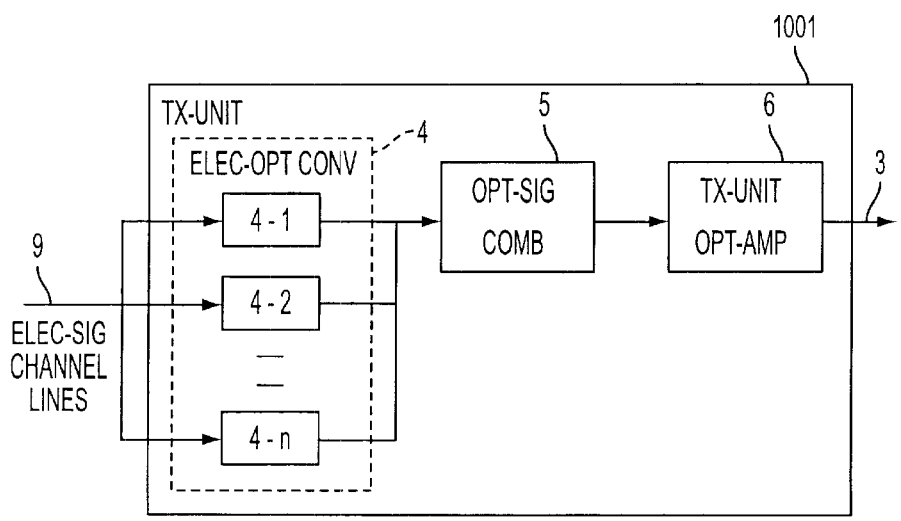
FIG. 1B is a block diagram of a terminal equipment 1001 in the multiplex optical communication system of the related art, in a transmitting mode.
Figure 1C:
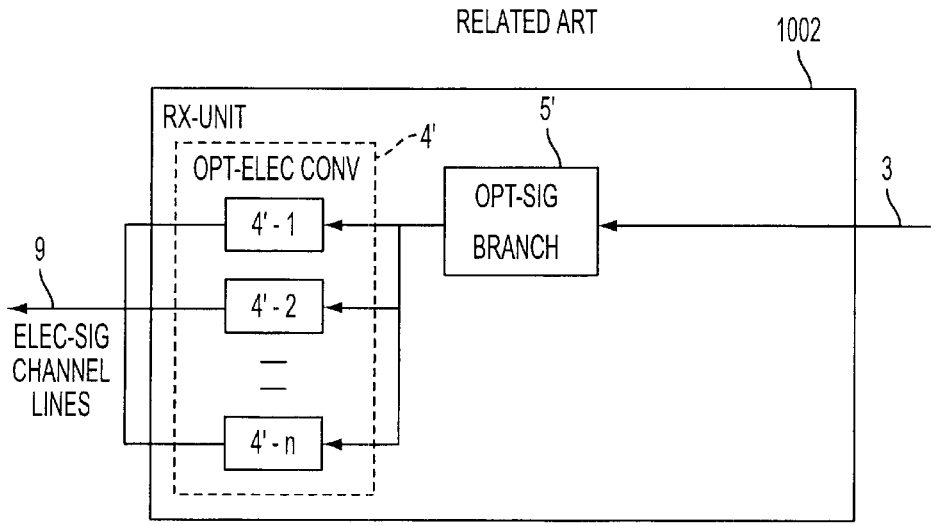
FIG. 1C is a block diagram of another terminal equipment 1002 in the multiplex optical communication system of the related art, in a receiving mode.
Figure 3:
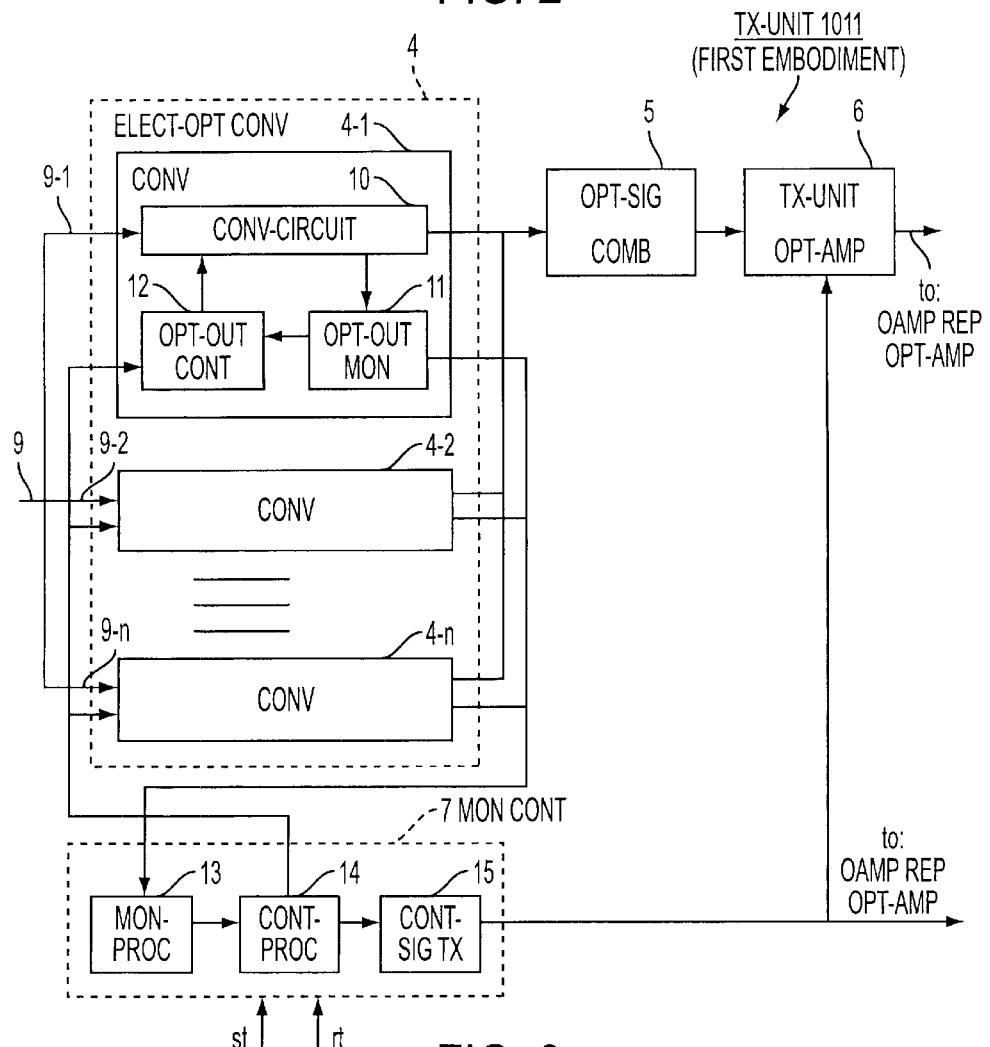
FIG. 3 is a block diagram of a transmitting unit in the multiplex optical communication system of the first embodiment.
Figure 4:
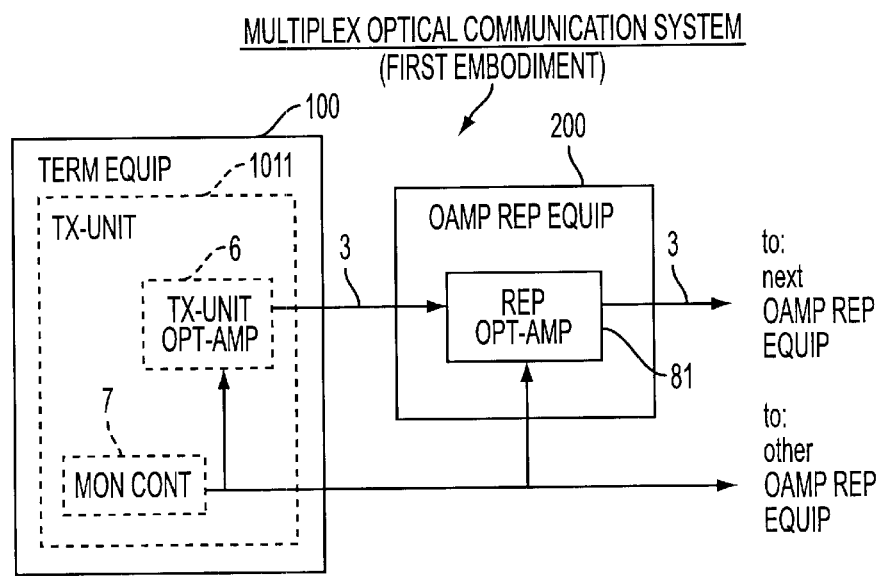
FIG. 4 is a block diagram of an optical amplifier repeater equipment in the multiplex optical communication system of the first embodiment, illustrating a connected state with the transmitting unit.

FIG. 3 is a block diagram for illustrating the TX-UNIT 1011 and FIG. 4 is a block diagram for illustrating a relationship between the TX-UNIT 1011 and the REP OPT-AMP 81. In FIGS. 3 and 4, the same reference symbol as in FIG. 1B designates the same unit as in FIG. 1B.

In FIG. 3, the TX-UNIT 1011 consists of an ELEC-OPT CONV 4, an OPT-SIG COMB 5 optically connected with the ELEC-OPT CONV 4 through optical fibers depicted by thick lines, a TX-UNIT OPT-AMP 6 optically connected with the OPT-SIG COMB 5 by an optical fiber depicted by a thick line and a monitor controller (MON CONT) (7) electrically connected with the ELEC-OPT CONV 4, the TX-UNITOPT-AMP 6 and the REP OPT-AMP 81, respectively. The ELEC-OPT CONV 4 consists of converter modules (CONVs) (4-1, 4-2, - - - and 4-n) each including an electro-optically converting circuit (CONV-CIRCUIT) (10), an optical output monitor (OPT-OUT MON) (11) and an optical output controller (OPT-OUT CONT) (12).

Electrical signals formed to channels are fed to the CONV-CIRCUITs in the CONVs 4-1, 4-2, - - - and 4-n through ELEC-SIGCHANNEL LINEs 9-1, 9-2, - - - and 9-n, respectively. In case of the WDM, the CONV-CIRCUITs 10 produce optical signals having a different frequency or wavelength each other. The OPT-OUT MONs 11 monitor the optical output from the CONV-CIRCUITs 10 respectively, producing monitored optical output signals. The monitored optical output signals are sent to the MON CONT 7 and to the OPT-OUT CONTs 12 in the CONVs 4-1, 4-2, - - - , 4-n.

The MON CONT 7 consists of a monitor processor (MON-PROC) (13), a control signal processor (CONT-PROC) (14) and a control signal transmitter (CONT-SIG TX) (15). The monitored optical output signals sent from the OPT-OUT MONs 11 are collected at the MON-PROC 13, producing a collected monitored signal. The collected monitored signal is sent to the CONT-PROC 14 at which an optical output control signal is produced and sent to both the OPT-OUT CONTs 12 and the CONT-SIG TX 15. The CONT-SIG TX 15 is for transmitting the optical output control signal to the TX-UNIT OPT-AMP 6 in TX-UNIT 1011 of the TERM EQUIP 100 and to the REP OUT-AMP 81 in the OAMP REP EQUIP 200. There is a case where the TX-UNIT 1011 includes no TX-UNIT OPT-AMP 6. In this case, the optical output control signal is sent only to the REP OPT-AMP 81. If there are a plurality of the OAMP REP EQUIP 200, the optical output control signal is sent to them through the REP OPT-AMP 81 in the OAMP REP EQUIP 200.

In each CONV, upon receiving the monitor output from the OPT-OUT MON 11 and the optical output control signal from the CONT-PROC 14, the OPT-OUT CONT 12 performs stabilization and increase or decrease control of the optical output from the CONV-CIRCUIT 10 by setting a rising or a falling time constant around the CONV-CIRCUIT 10.

In the MON CONT 7, when the MON-PROC 14 collects the optical output monitored signals from the OPT-OUT MONs 11 in the CONVs 4-1 to 4-n, the CONT-PROC 14 investigates how the optical signal is produced from the CONV-CIRCUIT 10 in each CONV. After the investigation, the CONT-PROC 14 produces the optical output control signal to start or stop increasing or decreasing the optical output of the CONV-CIRCUIT 10 in a CONV required to be added or removed. The CONT-PROC 14 has another function for producing the start-stop control signal when a start signal "st" or a reset signal "rt" is given through an interface, not depicted in FIG. 3, provided in the TERM EQUIP 100. The optical output control signal produced at the CONT-PROC 14 is sent to the OPT-OUT CONT 12 in each CONV, the TX-UNIT OPT-AMP 6 in the TX-UNIT 1011 and the REP OPT-AMP 81 in the OAMP REP EQUIP 200 through the CONT-SIG TX 15.

In FIG. 3, if the number of the CONVs 4-1, 4-2, - - - and 4-n is "a" (n=a) and an optical output per a single channel, which will be called a "single channel optical output" hereinafter, from each CONV is hypothesized to be equally "1" in a steady state, and when a CONV 4-(a+1) is newly added to the ELECT-OPT CONV 4, optical output of all channels, which will be called "all channel optical output" hereinafter, of the TX-UNIT OPT-AMP 6 becomes as $$a+1-\exp(-t/\tau 1). \tag{1}$$

In the expression (1), "t" is a lapse of time measured from time to start operation of the CONV 4-(a+1) and "τ1" is a time constant required to make the CONV 4-(a+1) produce its single channel optical output completely.

If a single channel optical output "p" is produced per each channel from the TX-UNIT OPT-AMP 6 or the REP OPT-AMP 8 and the all channel optical output is increased from "p×a" to "p×(a+1)" after a time constant τ2 and when τ1 and τ2 are equal to τ1 (τ1=τ2=τ), the all channel optical output from the TX-UNIT OPT-AMP 6 or the REP OPT-AMP 8 can be expressed by:

$$p\times a+\{(p\times(a+1)-(p\times a))\times\{1-\exp(-t/\tau)\}=p\times a+p\times\{1-\exp(-t/\tau)\}. \quad (2)$$

At this time, during the transitional state, the single channel optical output from the TX-UNIT OPT-AMP 6 or the REP OPT-AMP 81 is given as:

$$p\times a+p\times\{1-\exp(-t/\tau)\}\times\{1-\exp(-t/\tau)\}\times\{1/(a+1-\exp(-t/\tau)\}=p. \quad (3)$$

The expression (3) signifies that when a CONV 4-(a+1) is added to the ELEC-OPT CONV 4 and starts to operate, a single channel optical output from the TX-UNIT OPT-AMP 6 (and the REP OPT-AMP 81) can be kept to "p", by making the time constant τ2 equal to the time constant τ1. By virtue of changing output power of the TX-UNIT OPT-AMP 6 (and the REP OPT-AMP 81) as controlling the time constant τ2 so as to be nearly equal to τ1, the problem of increasing the waveform distortion occurring in the multiplex optical signal due to the non-linear effect of the OPT-TRANS LINE 3 can be solved.

In opposition to the above, when one of the CONVs 4-1 to 4-a is removed by stopping operation, a single channel optical output from the TX-UNIT OPT-AMP 6 (and the REP OPT-AMP 81) can be always kept to "p", by controlling a decrease rate of the all channel optical output from the TX-UNIT OPT-AMP 6 (and the REP OPT-AMP 81) so that a time constant (τ4) required for decreasing the level of the all channel optical output from the TX-UNIT OPT-AMP 6 (and the REP OPT-AMP 81) to a value "p×(a-1)" is the same as a time constant (τ3) required for extinguishing the single channel optical output of the removed CONV to a zero level. By virtue of controlling thus, the problem of increasing the waveform distortion occurring in the multiplex optical signal due to the non-linear effect of the OPT-TRANS LINE 3 can be solved.

The time constant such as τ1 or τ2 in the above description will be called "rising time constant" and the time constant such as τ3 or τ4 will be called "falling time constant" hereinafter.

In FIG. 3, the MON CONT 7 always monitors the optical output from the CONVs 4-1 to 4-n at the MON-PROC 13, and when a level of the optical output from a CONV is varied, the variation is processed at the MON-PROC 13 and the processed result is sent to the CONT-PROC 14 at which the optical output control signal is produced for controlling the all channel optical output from the TX-UNITOPT-AMP 6 and the REP OPT-AMP 81 in correspondence with the level variation of the optical output of the CONVs 4-1 to 4-n. The optical output control signal is transmitted from the CONT-SIG TX 15 to the TX-UNIT OPT-AMP 6 and the REP OPT-AMP 81 respectively.

Figure 5:
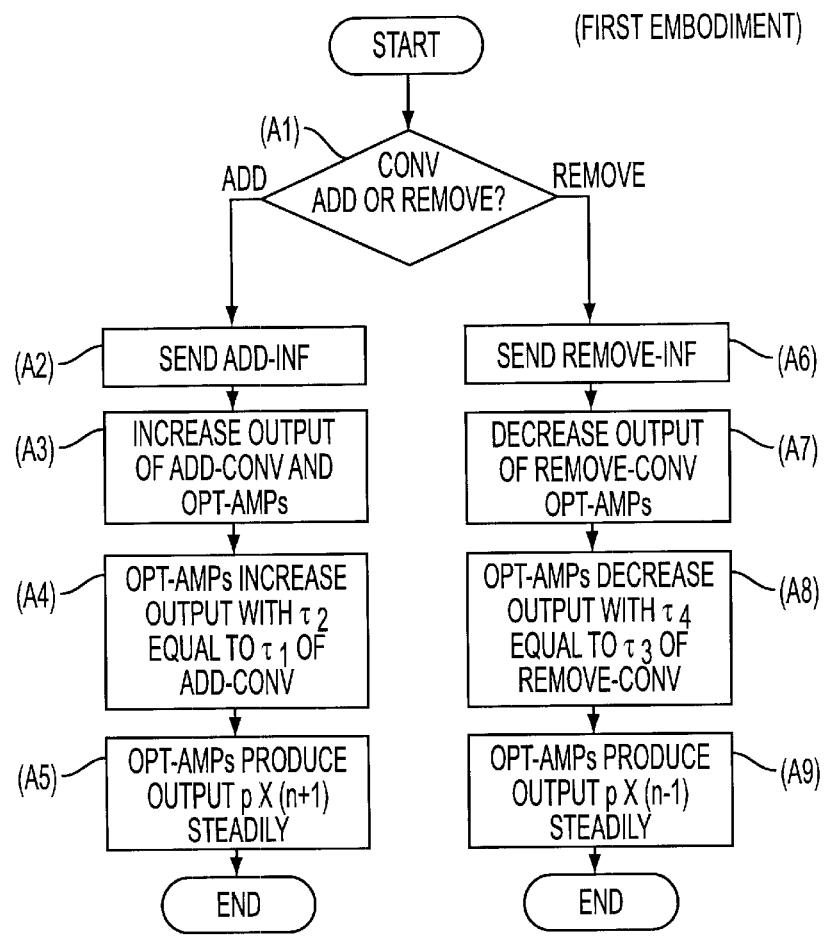
FIG. 5 is a flow chart for illustrating operation steps in case of the first embodiment.

The first embodiment of the present invention is based on controlling the time constant τ2 so as to be equal to τ1 as described in reference with the expression (3). The "control" will be called "time constant control" and system on the "time constant control" will be called "time constant control system" hereinafter. FIG. 5 is a flow chart for illustrating the operation steps in case of the first embodiment. In the first embodiment, the ELECT-OPT CONV 4, the MON CONT 7 and the TX-UNIT OPT-AMP 5 in the TX-UNIT 1011 of the TERM EQUIP 100 and the REP OPT-AMP 81 in OAMP REP EQUIP 200 operate in accordance with steps A1 to A9 in FIG. 5. In the description of the steps A1 to A9, the added CONV will be used for the CONV 4-(a+1) and a removed CONV will be used for a CONV removed from the ELEC-OPT CONV 4 hereinafter.

Whether CONV is added or removed is determined by a maintenance worker (step A1, CONV ADDED OR REMOVED?). In case a CONV is added, the added information is sent to the MON CONT 7 by an installation monitor unit which will be described later, a higher rank apparatus not depicted in FIGS. 3 and 5, or the maintenance worker (step A2, SEND ADD-INF). Upon receiving the added information, the CONT-PROC 14 in the MON CONT 7 issues a command to raise optical output to the added CONV, and the CONT-SIG TX 15 in the MON CONT 7 issues a command to raise optical output to the TX-UNIT OPT-AMP 6 and the REP OPT-AMP 81 respectively (step A3, RAISE OUTPUT OF ADD-CONV AND OPT-AMPs). The added CONV increases the single channel optical output to a prescribed value by the command issued from the CONT-PROC 14 passing through the OPT-OUT CONT 12 in the added CONV, and the TX-UNITOPT-AMP 6 and the REP OPT-AMP 81 increase the optical output at a rate determined by the time constant τ2 which is previously set up in equal to the rising time constant τ1 of the added CONV (step A4, OPT-AMPs INCREASE OUTPUT WITH τ2 EQUAL TO τ1 OF ADD-CONV). When the single channel optical output of the added CONV becomes the prescribed value and the optical output from the TX-UNIT OPT-AMP 6 and the REP OPT-AMP 81 become respectively a value equal to the product of the single channel optical output, the added CONV, the TX-UNIT OPT-AMP 6 and the REP OPT-AMP 81 maintain the product value respectively. For example, the added CONV, the TX-UNIT OPT-AMP 6 and the REP OPT-AMP 81 maintain the product value "p×(a+1)" respectively in case "p" is the power of the single channel output and "a+1" is the total number of the operating CONVs (step A5, OPT-AMPs OUTPUT p×(a+1) STEADILY).

In case a CONV is removed from the ELEC-OPT CONV 4 because of trouble or maintenance, the remove information is sent to the MON CONT 7 from a higher rank apparatus not depicted in FIGS. 3 and 5, or the maintenance worker (step A6, SEND REMOV-INF). Upon receiving the removing information, the MON CONT 7 sends a command to decrease single channel optical output to there moved CONV and a command to decrease the optical output to the TX-UNIT OPT-AMP 6 and the REP OPT-AMP 81 respectively (step A7, DECREASE OUTPUT OF REMOVE-CONV AND OPT-AMPs). Upon receiving the decreasing command, the removed CONV decreases the single channel optical output toward zero and the TX-UNIT OPT-AMP 6 and the REP OPT-AMP 81 decrease the optical output at a rate determined by a time constant (τ4) which is previously set up in equal to the falling time constant (τ3) of there moved CONV (step A8, OPT-AMP DECREASE OUTPUT WITH τ4 EQUAL TO τ3 OF REMOVE-CONV). Then, when the TX-UNITOPT-AMP 6 and the REP OPT-AMP 81 become respectively a value being the product of the single channel optical output, for example "p", and the number, for example "a-1", of operating CONVs, the TX-UNIT OPT-AMP 6 and the REP OPT-AMP 81 maintain the product value "p×(a-1)" respectively and the removed CONV is completely stopped in operation (step A9, OPT-AMPs PRODUCE OUTPUT p×(a-1) STEADILY).

Figure 6:
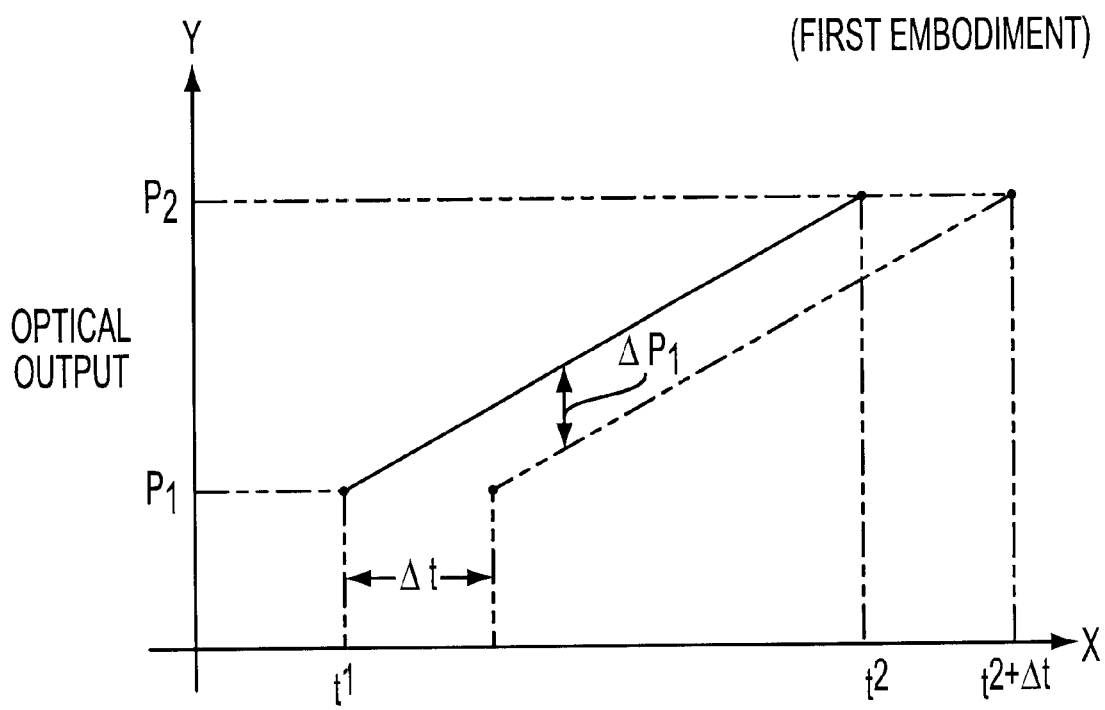
FIG. 6 is a graph for illustrating an increasing state of optical output from a transmitting unit optical amplifier or a repeater optical amplifier, in case of the first embodiment.

FIG. 6 is a graph for illustrating an increasing state of the optical output from the TX-UNIT OPT-AMP 6 (or the REP OPT-AMP 81). In FIG. 6, a y-axis indicates the optical output of the TX-UNIT OPT-AMP 6 and an x-axis indicates time. When the TX-UNIT OPT-AMP 6 produces output "p" for a single optical signal and the operating number of the CONVs is "a", the optical output of the TX-UNITOPT-AMP 6 becomes p×a finally which will be called $P_1(p \times a=P_1)$, and when a CONV is added to the ELECT-OPT CONV 4 and the added CONV starts to operate at time t1, the optical output of the TX-UNIT OPT-AMP 6 becomes p×(a+1) finally which will be called $P_2(p \times (a+1)=P_2)$. In FIG. 6, a solid line indicates an ideal increasing state of the optical output of the TX-UNIT OPT-AMP 6 from $P_1$ to $P_2$. A rate of increasing is determined by the rising time constant τ2 of the TX-UNIT OPT-AMP 6 which is controlled so as to be equal to the rising time constant τ1 of the added CONV. By virtue of making the rising time constant τ2 equal to the rising time constant τ1, the output power of the single optical signal from the TX-UNIT OPT-AMP 6 can be avoided varying. This results in preventing the waveform distortion due to the non-linearity effect of the OPT-TRANS LINE 3 and the SNR degradation from occurring in the multiplex optical communication system.

However, there is a case where a time delay occurs between the time required to raise the optical output of the added CONV and a time required to increase the optical output of the TX-UNIT OPT-AMP 6. A dotted line in FIG. 6 indicates an actual state of increasing the optical output of the TX-UNIT OPT-AMP 6 from P1 to P2 in case the time delay occurs. FIG. 6 shows that though the added CONV rises the output power during time t1 to t2, the TX-UNIT OPT-AMP 6 increases the optical output during time t1+Δt to t2+Δt having a delay time Δt. That is, because of the delay time Δt, an error $\Delta P_1$ of output power appears between the actual state of power increasing shown by the dotted line and the ideal state of power increasing shown by the solid line. Incidentally, the time interval between t1 and t2 is several ms to several second and Δt is several % to approximately 25% of the time interval.

Figure 7:
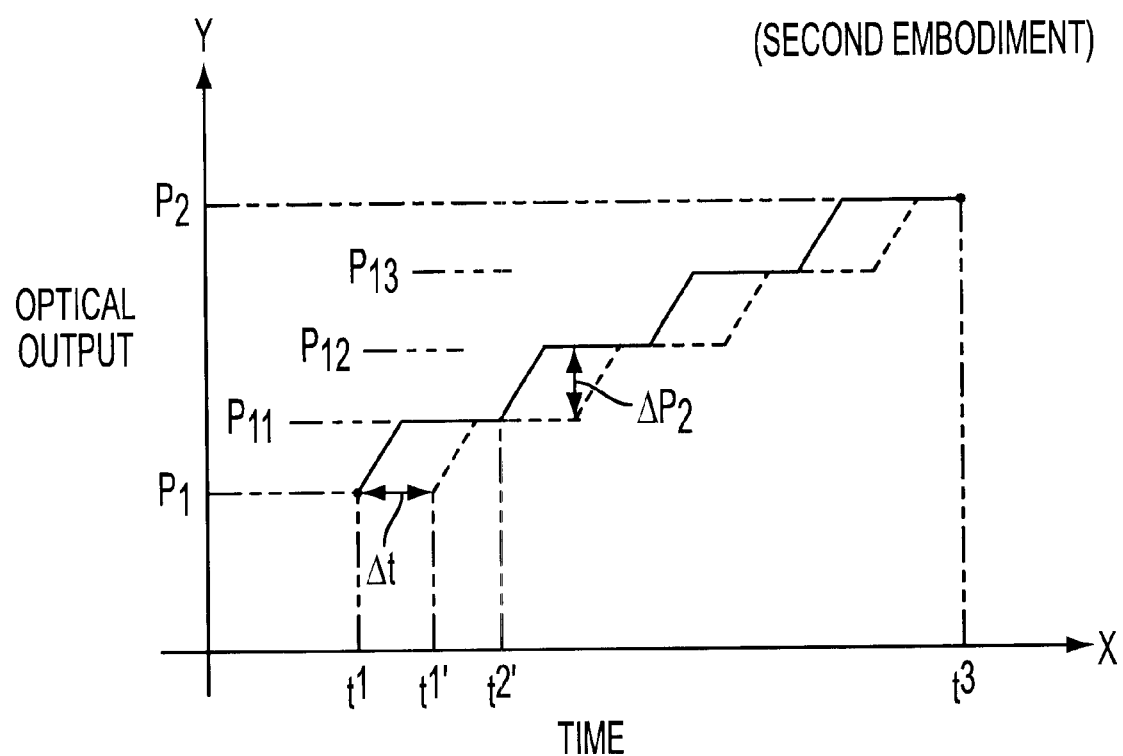
FIG. 7 is a graph for illustrating an increasing state of optical output from a transmitting unit optical amplifier or a repeater optical amplifier, in case of a second embodiment of the present invention.

The error $\Delta P_1$ of output power can be decreased by improving the time constant control so that the output power of the added CONV rises in a step-by-step manner as shown in FIG. 7. FIG. 7 illustrates the step-by-step manner for increasing the output power of the added CONV under the improved time constant control. In FIG. 7, symbols $P_{11}$, $P_{12}$ and $P_{13}$ indicate halfway output from the TX-UNIT OPT-AMP 6 to be reached at halfway times in the time interval between t1 and t3. The added CONV produces optical output having levels corresponding to halfway objective values, a first objective value, a second objective value and a third objective value, in correspondence with $P_{11}$, $P_{12}$ and $P_{13}$ produced at the halfway times respectively.

Before the added CONV is added, the output power of the TX-UNIT OPT-AMP 6 is $P_1$ steadily. When the added CONV is added and it starts to raise optical output at time t1, the TX-UNIT OPT-AMP 6 starts to increase output power under the time constant control, at time t1' delayed an amount of Δt from time t1. When the optical output of the added CONV increases as depicted by a thick line in FIG. 7 and reaches a level corresponding to the first objective value, the output of the added CONV is stopped to be raised until the TX-UNIT OPT-AMP 6 produces the optical output $P_{11}$. After the optical output of the TX-UNIT OPT-AMP 6 increases as depicted by a dotted line and reaches $P_{11}$, the added CONV starts to rise the optical output at time t1" and rises the optical output until the optical output reaches a level corresponding to the second objective value. After delaying, Δt from time t1", the TX-UNITOPT-AMP 6 starts to rise the optical output and the optical output increases until becoming $P_{12}$. These steps are repeated step by step, increasing the output power of the TX-UNIT OPT-AMP 6 toward $P_2$.

When the output of the TX-UNIT OPT-AMP 6 reaches $P_2$ at time t3, the step-by-step increasing operation is ended.

In FIG. 7, under the step-by-step manner, an error $\Delta P_2$ of the output power of the TX-UNIT OPT-AMP 6 appears between the actual increasing state shown by the dotted line and the ideal increasing state as shown by the solid line. However, since the error $\Delta P_2$ appears intermittently as shown in FIG. 7, an average error obtained by summing individual error $\Delta P_2$ from t1 to t2 becomes small in comparison with an average error the error $\Delta P_1$ in between time t1 and time t2+Δt in FIG. 6. The details of the multiplex optical communication system operating under the time constant control performed in the step-by-step manner will be described later as a second embodiment of the present invention.

Figure 8:
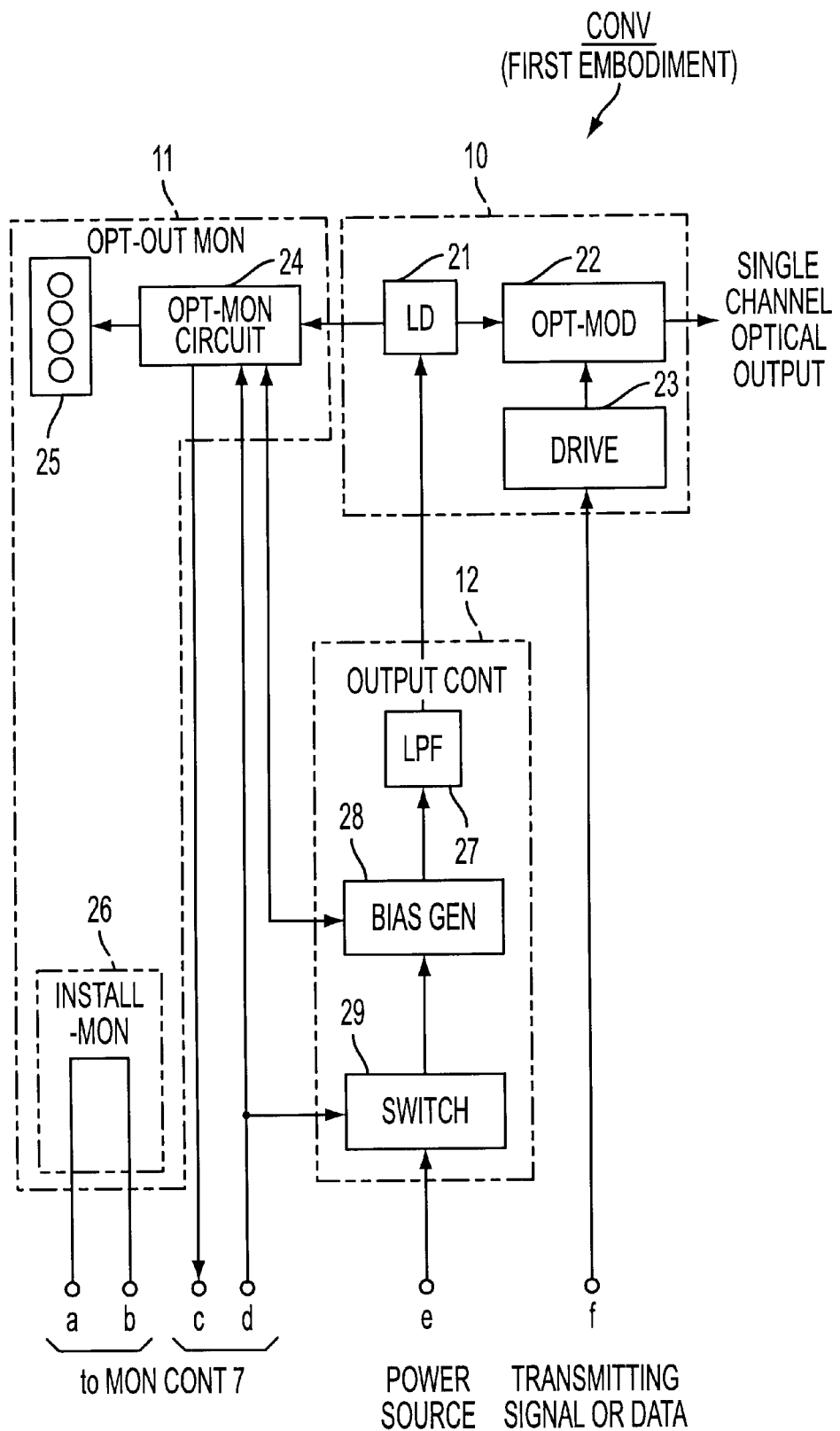
FIG. 8 is a block diagram of an electro-optical signal converter for illustrating the first embodiment.

FIG. 8 is a block diagram for illustrating one of the CONVs 4-1 to 4-n in case of the first embodiment. The one of the CONVs 4-1 to 4-n will be called simply "CONV" hereinafter. In FIG. 8, the same reference numeral as in FIG. 3 designates the same unit as in FIG. 3. The CONV principally consists of the CONV-CIRCUIT 10, the OPT-OUT MON 11 and the OPT-OUT CONT 12. The CONV-CIRCUIT 10 consists of a semiconductor laser diode (LD) (21) for emitting laser light, an optical modulator (OPT-MOD) (22) for producing a single channel optical signal by intentionally modulating laser light emitted from the LD 21, and a driving circuit (DRIVE) (3) for driving the OPT-MOD 22 upon receiving an electrical signal or data to be transmitted, through the ELEC-SIG CHANNEL LINE 9. The OPT-OUTMON 11 consists of an operation monitoring circuit (OPT-MON CIRCUIT) (24) for monitoring the output power of the laser upon receiving a part of laser light emitted from the LD 21, an indicator (25) for indicating a monitored result obtained by receiving a part of monitored output from the OPT-MON CIRCUIT 24 and an installation monitor unit (INSTALL-MON) (26) for monitoring that the CONV is installed in the ELECT-OPT CONV 4. The OPT-OUT CONT 12 consists of a low pass filter (LPF) (27), a bias generating circuit (BIASGEN) (28) for generating a bias voltage applied to the LD 21 and a switch (SWITCH) (29) for switching a source voltage for the BIASGEN 28. The rising and falling time constant can be previously varied and set for the CONV by adjusting the LPF 27. Terminals "a, b, c and d" are for connecting the CONV with the MON CONT 7, terminal "e" is a power source terminal and terminal "f" is a terminal connected with the ELECT-SIG CHANNEL LINE 9 for receiving the electrical signal or data to be transmitted.

When the SWITCH 29 is ON by the optical output control signal sent from the MON CONT 7 through terminal "d", DC power is applied to the BIAS GEN 28 through terminal "e" and a bias voltage generated at the BIAS GEN 28 is supplied to the LD 21 through the LPF27. The optical output power from the LD 21 is monitored by the OPT-MON CIRCUIT 24, so that the LD 21 transmits optical power finally having the objective value. In this case, the optical power transmitted from the LD 21 is gradually raised in accordance with the bias voltage gradually raised. In other words, when the LD 21 is started to transmit the optical power, the optical power rises gradually at a rate determined by a time constant (τ1) corresponding to a rising rate of the bias voltage generated at the BIAS GEN 28.

The OPT-MON CIRCUIT 24 monitors the optical output from the LD 21. When an accident occurs in the CONV, the OPT-MONCIRCUIT 24 issues a command to stop the operation of the CONV through terminal "c" and at the same time, the OPT-MON CIRCUIT 24 controls the indicator 25 so as to make the INDICATOR 25 indicate an accident occurrence. The indicator 25 has a function of indicating a state of "normally operating", "varying optical output", "accident occurs" or "stopping operations". When many CONVs are installed in a rack, the indicator 25 is very helpful to distinct the operation state of the CONVs and very useful to perform quick exchange of a CONV when an accident occurs in the CONV.

The INSTALL-MON 26 informs to the MON CONT 7 that the CONV is installed in the ELEC-OPT CONV 4 by using a jumper wire provided on a back-board of the INSTALL-MON 26. When the CONV is installed in the ELEC-OPT CONV 4, terminals "a" and "b" is electrically connected by the jumper wire. By virtue of connecting "a" and "b", the installation of the CONV to the ELEC-OPT CONV 4 is informed to the MON CONT 7.

Figure 9:
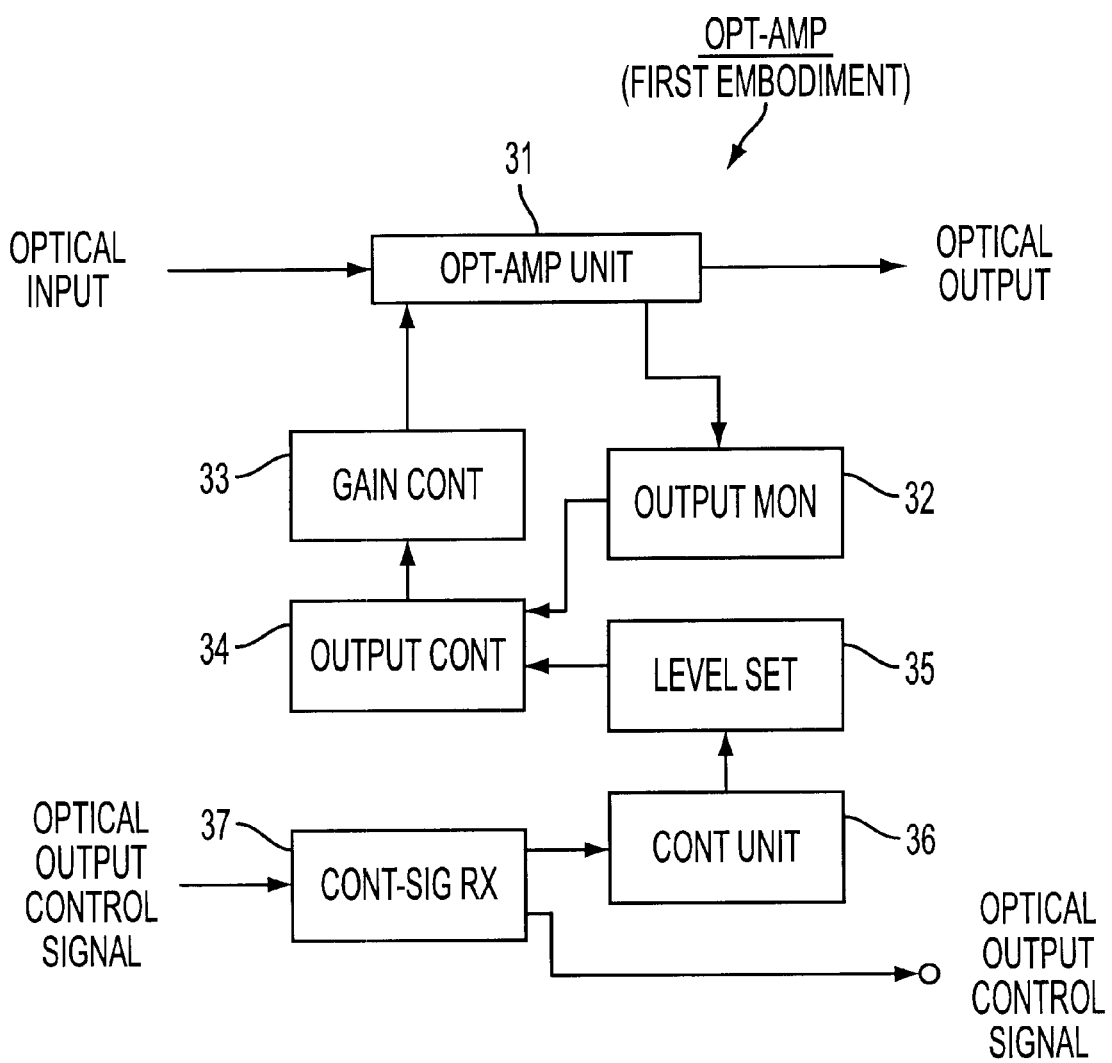
FIG. 9 is a block diagram of the transmitting unit optical amplifier or the repeater optical amplifier, in case of the first embodiment.

FIG. 9 is a block diagram for illustrating the TX-UNIT OPT-AMP 6 shown in FIG. 3 or the REP OPT-AMP 81 shown in FIG. 3, used in the first embodiment. The TX-UNIT OPT-AMP 6 or the REP OPT-AMP 81 consists of an optical amplifier unit (OPT-AMP UNIT) (31), an optical output monitoring unit (OUTPUT MON) (32), a gain controlling unit (GAIN CONT) (33), an output constantly control unit (OUTPUT CONT) (34), an output level setting unit (LEVEL SET) (35), a control unit (CONT UNIT) (36) and a control signal receiving unit (CONT-SIG RX) (37).

The OPT-AMP UNIT 31 is an optical amplifier composed of an Erbium-doped fiber amplifier and a pump light semiconductor laser. The OUTPUT CONT 34 controls the OPT-AMP UNIT 31 through the GAIN CONT 33 so that the optical output of the OPT-AMP UNIT 31 becomes a prescribed constant level by making a comparison between a level of optical output detected by the OUTPUT MON 32 and an output level set at the LEVEL SET 35.

Upon receiving the optical output control signal from the MON CONT 7 (refer FIG. 3), the CONT-SIG RX 37 sends the optical output control signal to the CONT UNIT 36 and other REP OPT-AMPs 81. Upon receiving the optical output control signal, the CONT UNIT 36 controls the LEVEL SET 35 so that the LEVEL SET 35 produces a setting level of the optical output from the OPT-AMP UNIT 31 at a gradually increasing or decreasing rate. When the CONV is added, the setting level is gradually increased in accordance with the rising time constant of the added CONV, and when the CONV is removed, the setting level is gradually decreased in accordance with the falling time constant of the removed CONV. The setting level produced at the LEVEL SET 35 is sent to the OPT-AMP UNIT 31 through the OUTPUT CONT 34 and the GAIN CONT 33 in order to increase or decrease the level of the optical output from the OPT-AMPUNIT 31. The optical output level of the OPT-AMP UNIT 31 is monitored by the OUTPUT MON 32 and the monitored output from the OUTPUT MON 32 is sent to the OUTPUT CONT 34. When the monitor output reaches a level corresponding to the number of the CONVs (refer FIG. 3), the OUTPUT CONT 34 controls so that the level is always kept constant. Wherein, the number is increased when CONV is added and the number is decreased when CONV is removed. The TX-UNIT OPT-AMP 6 or the REP OPT-AMP 81 will be detailed later in reference with FIG. 11.

Figure 10:
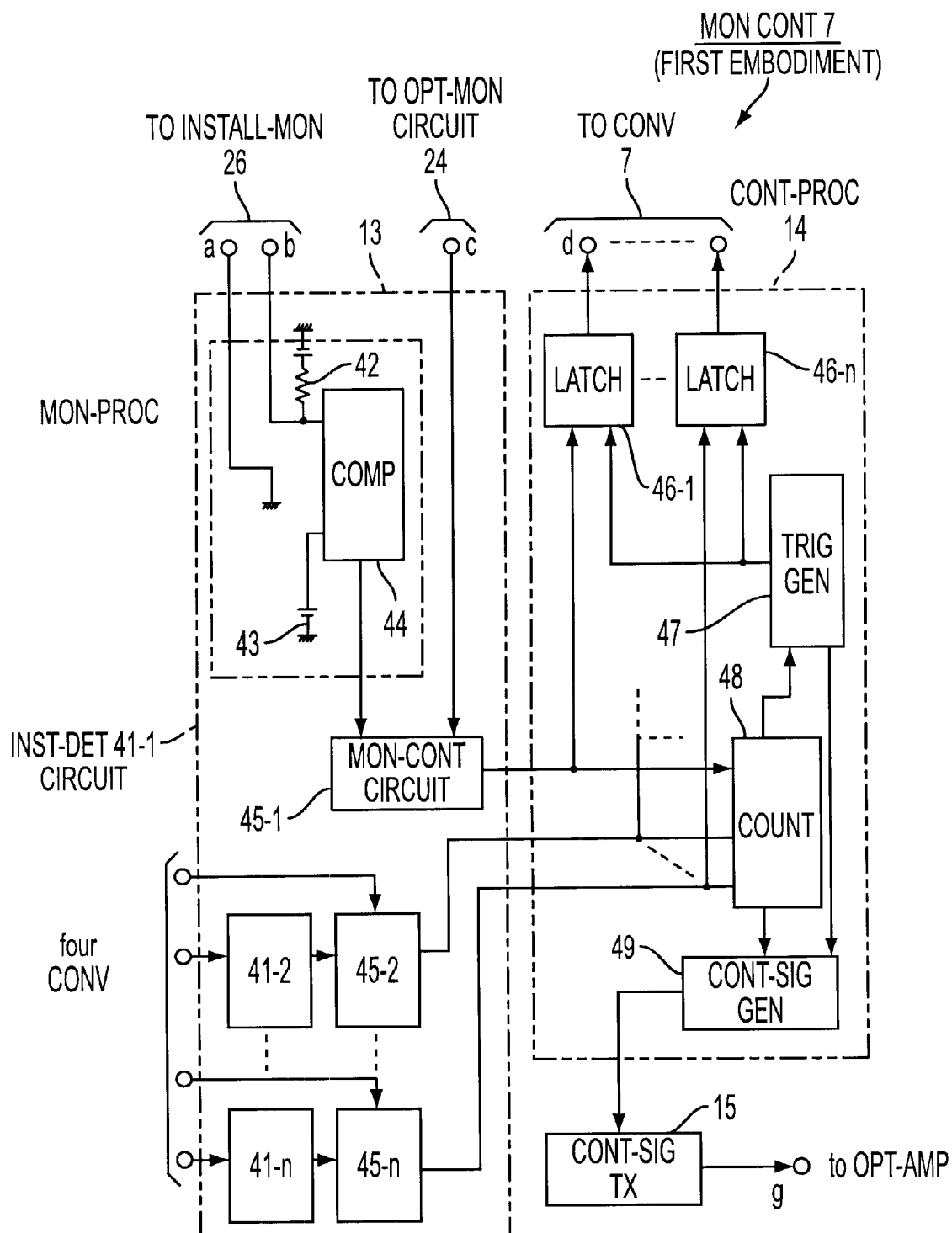
FIG. 10 is a block diagram of a monitor controller of the transmitting unit, in case of the first embodiment.

FIG. 10 is a block diagram for illustrating the MON CONT 7 (refer FIG. 3) used in the first embodiment of the present invention. In FIG. 10, the same reference numeral as in FIG. 3 designates the same unit as in FIG. 3 and the same reference symbol as in FIG. 8 designates the same part as in FIG. 8. As shown in FIGS. 3 or 10, the MON CONT 7 principally consists of the MON-PROC 13, the CONT-PROC 14 and the CONT-SIG TX 15. In FIG. 10, the MON-PROC 13 and the CONT-PROC 14 are shown in a dot-dash-line box respectively and the CONT-SIG TX 15 is shown in a solid line box.

The MON-PROC 13 consists of installation detecting circuits (INST-DET CIRCUIT) (41-1, 41-2, - - - and 41-$n$) and monitor control circuits (MON-CONT CIRCUITs) (45-1, 45-2, - - - and 45-$n$) in corresponding to the CONVs 4-1, 4-2, - - - and 4-$n$ respectively. The INST-DET CIRCUITs 41-1, 41-2, - - - and 41-$n$ are for detecting whether the CONVs 4-1, 4-2, - - - and 4-$n$ are installed in the TX-UNIT 1011 respectively. Each of the INST-DET CIRCUITs 41-1, 41-2, - - - and 41-$n$ consists of a resister (42), a standard voltage source (43) and a comparator (COMP) (44).

When one of the CONVs 4-1, 4-2, - - - and 4-$n$ is not installed in the ELECT-OPT CONV 4, a terminal "a" and "b" is not electrically connected with the jumper wire in the INSTALL-MON 26 shown in FIG. 8. Therefore potential at the terminal "b" becomes higher than earth potential at the terminal "a". Upon detecting a difference of the potential between the terminals "a" and "b", the COMP 44 detects that the removed CONV is not installed in the ELEC-OPT CONV 4. When, for example, a CONV is newly installed in the TX-UNIT 1011, terminal "a" and "b" are connected with the jumper wire in the INSTALL-MON 26, so that potential at the terminal "b" becomes equal to the earth potential at the terminal "a". Upon detecting the equal earth potential at the terminal "a" and "b", the COMP 44 detects that the CONV is installed in the ELEC-OPT CONV 4. Upon receiving the potential difference between the terminals "a" and "b" from the COMP 44 and the command to stop the operation of the removed CONV or to start the operation of the added CONV through terminal "c", the MON-CONT CIRCUIT 45-1 sends a stop operation signal to a latch circuit 46-$x$ or a start operation signal to a latch circuit 46-(a+1) in the CONT-PROC 14, respectively. The latch circuits are provided in the CONT-PROC 14 which will be described below.

The CONT-PROC 14 consists of latch circuits (LATCHes) (46-1, 46-2, - - - and 46-$n$), a trigger generator (TRIG GEN) (47), a counter (COUNT) (48) and a control signal generator (CONT-SIG GEN) (49).

The COUNT 48 holds the total number of the operating CONVs and produces a count up signal and performs up-counting or down-counting in accordance with the stop operation signal or the start operation signal sent from relevant one of the MON-CONTCIRCUITs 45-1, 4-2, - - - and 45-$n$, and when the counting is completed, the COUNT 48 controls the TRIG GEN 47 so that the TRIGGEN 47 adds a trigger signal to the LATCHes 46-1, 4-2, - - - and 46-$n$ and to the CONT-SIG GEN 49. Upon receiving the trigger signal, the relevant one of the LATCHes 46-1, 4-2, - - - and 46-$n$ latches the stop operation signal or the start operation signal sent from the relevant one of MON-CONT CIRCUITs 45-1, 45-2, - - - and 45-$n$. For example, when the CONV 4-1 is installed and starts to operate, the start operation signal produced at the MON-CONT 45-1 is sent to terminal "d" through the LATCH 46-1 opened up by a trigger signal sent from the TRIG GEN 47. The CONT-SIG GEN 49 is also controlled by an output signal from the COUNT 48 and the trigger signal from the TRIG GEN 47, so that the CONT-SIG GEN 49 produces the optical output control signal for starting or stopping increasing or decreasing output of the TX-UNIT OPT-AMP 6 and REP OPT-AMP 81. Upon receiving the optical output control signal from the CONT-SIG GEN 49, the CONT-SIG TX 15 transmits the optical output control signal to the TX-UNIT OPT-AMP 6 and the REP OPT-AMP 81 respectively.

Figure 11:
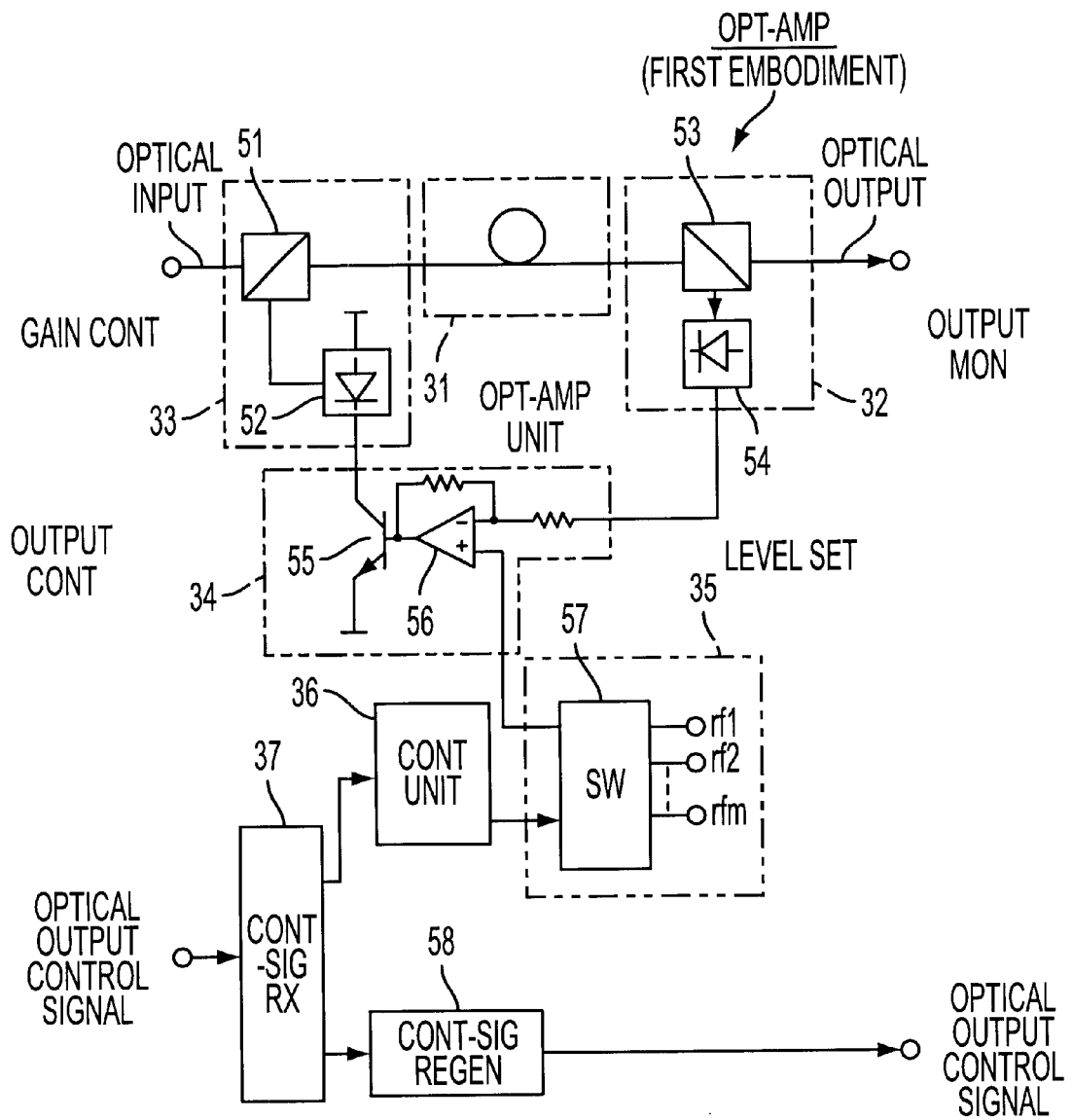
FIG. 11 is a block diagram of the transmitting unit optical amplifier or the repeater optical amplifier, in case of the first embodiment.

FIG. 11 is a block diagram for illustrating a detail of the TX-UNIT OPT-AMP 6 or the REP OPT-AMP 81 used in the first embodiment of the present invention. In FIG. 11, the same reference numeral as in FIG. 9 designates the same unit as in FIG. 9. As described in reference with FIG. 9, the TX-UNIT OPT-AMP 6 or the REP OPT-AMP 81 principally consists of the OPT-AMP UNIT 31, the OUTPUTMON 32, the GAIN CONT 33, the OUTPUT CONT 34, the LEVEL SET 35, the CONT UNIT 36, the CONT-SIG RX 37 and a control signal regenerator (CONT-SIG REGENE) (58). The GAIN CONT 33 consists of an optical combiner (51) and a semiconductor laser (52), the OUTPUT MON 32 consists of an optical branch (53) and a photo diode (54), the OUTPUT CONT 34 consists of a transistor amplifier (55) and an operational amplifier (56) and the LEVEL SET 35 includes a switching circuit (SW) (57). The OPT-AMP UNIT 31 is composed of an Erbium-doped optical fiber. FIG. 11 shows the Erbium-doped optical fiber in a case where forward pumping is performed by a semiconductor laser (52). Instead of the forward pumping, backward pumping or both forward and backward pumping can be used.

Moreover, an isolator, not depicted in FIG. 11, for interrupting a turn back light of the OPT-AMP UNIT 31 can be added to the OPT-AMP UNIT 31. Usually, a wavelength in a band of 1.48 $\mu$m or 0.98 $\mu$m can be used for an optical signal and wavelength in a band of 1.55 $\mu$m can be used for a pumping light emitted from the laser 52.

The operational amplifier 56 compares one of reference values "rf1, rf2, - - - or rfm" switched by the SW 57 with the optical output detected at the OUTPUT MON 32, producing comparison output. Upon receiving the comparison output from the operational amplifier 56, the transistor amplifier 55 controls the laser 52 so that the pumping light emitted from the laser 52 makes the OPT-AMP UNIT 31 produce the optical output at a constant level.

The optical output control signal transmitted from the CONT-SIG TX 15 (refer FIG. 3) is sent to the CONT UNIT 36 through the CONT-SIG RX 37. The CONT UNIT 36 controls the SW 57 so that the SW 57 switches either one of the reference values. By virtue of the switched reference value, the optical output of the OPT-AMP UNIT 31 becomes a level corresponding to the total number of actually operating CONVs, obtained after increasing or decreasing the CONV.

The reference values "rf1, rf2, - - - or rfm" are minutely provided and switched by the SW 57, for increasing or decreasing the optical output of the OPT-AMP UNIT 31 finally in corresponding to the rising time constant of the added CONV or the falling time constant of the removed CONV, respectively. The SW 57 is controlled by the CONT UNIT 36 so that the switching is closely performed as time passes in the rising or falling process of the output power of the added or removed CONV. We design that the time constant of the OUTPUT CONT 34 equal to the rising time constant of the added CONV or the falling time constant of the removed CONV.

The step-by-step manner as shown in FIG. 7 is also performed under the time constant control performed by the MON CONT 7. In this case, one of the MON-CONT CIRCUITs 45-1 to 45-n and the CONT-SIG GEN 49 send the optical output control signal to the OPT-MON CIRCUIT 24 in the CONV, the TX-UNIT OPT-AMP 6 and the REP OPT-AMP 81, under condition of the rising or falling time constant, the halfway objective values and prescribed times to attain the halfway objective value.

Upon setting the halfway objective values, the prescribed times and the rising or falling time constant at the CONV such as the CONV 4-1, 4-2, - - - or 4-n and the OPT-AMP such as the TX-UNIT OPT-AMP 6 and the REP OPT-AMP 81, the optical output from the TX-UNIT OPT-AMP 6 and the REP OPT-AMP 81 is controlled so as to be increased or decreased in the step-by-step manner.

A third embodiment of the present invention is based on changing a controlling manner of the optical output from the optical amplifier used in the TX-UNIT OPT-AMP 6 and the REP OPT-AMP 81. System for changing the control manner thus will be called "control manner change system" hereinafter. By virtue of the control manner change system, the optical amplifier is controlled as follows:

usually the optical amplifier is controlled so as to produce optical output at a constant level under the constant output level control, as done in the prior art;

when a CONV is added to or removed from the ELEC-OPT CONV 4, the constant output level control is changed to constant gain control, so that the optical amplifier is controlled so as to produce the optical output under the constant gain control; and when the optical output of the added CONV is completely raised or the optical output of the removed CONV is completely decreased, the constant gain control is changed back to the usual constant output level control, so that the optical amplifier is controlled so as to produce the optical output under the constant output level control.

Figure 12:
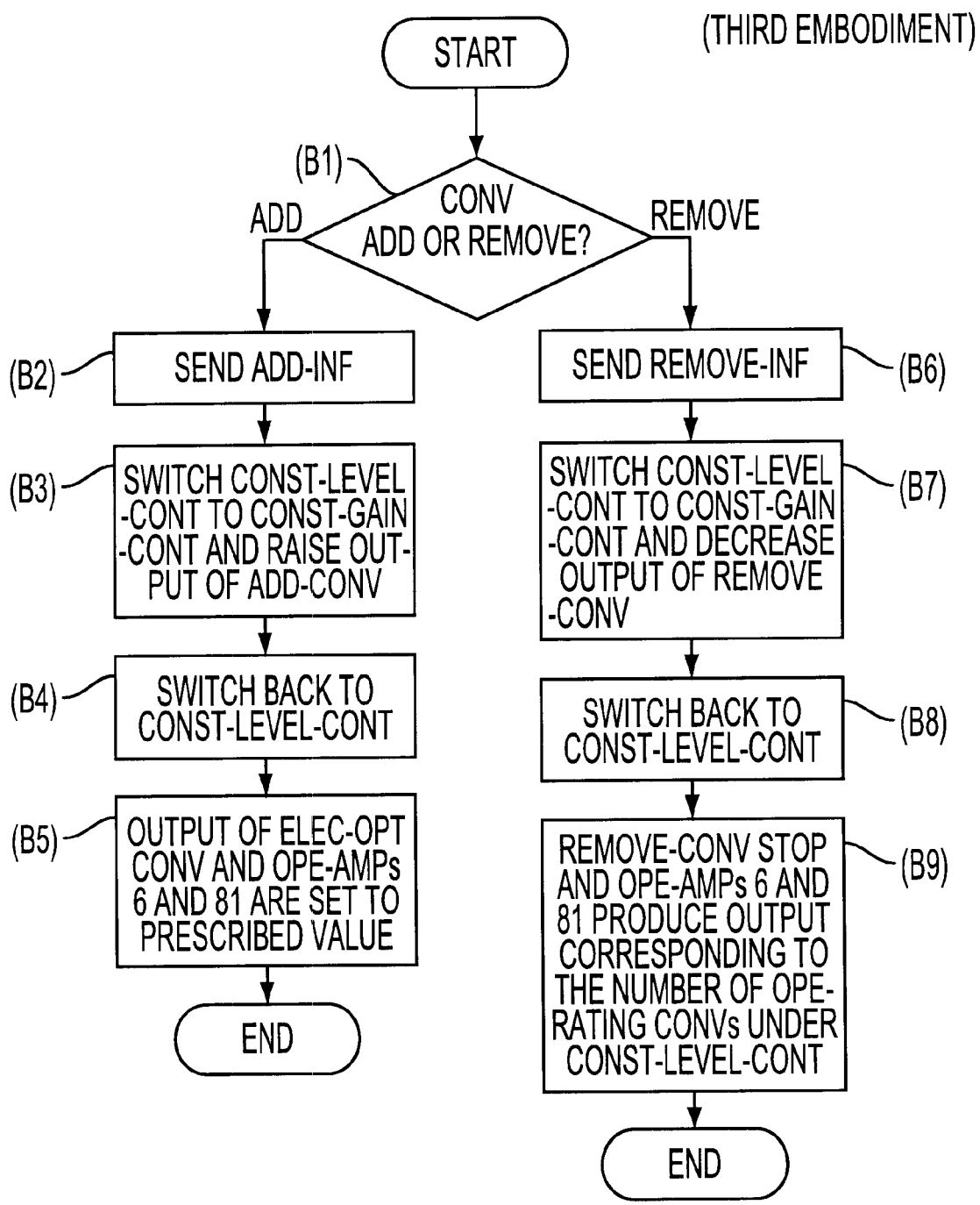
FIG. 12 is a flow chart for illustrating operation steps in case of a third embodiment of the present invention.

FIG. 12 is a flowchart for illustrating operation steps of the control manner change system used in the third embodiment. The OPT-AMP usually operates under the constant output level control system. Upon determining whether the CONV is added to or removed from the ELEC-OPT CONV 4 (step B1, CONV ADD or REMOVE?), the OPT-OUT MON 11 in the CONV (see FIG. 8) or a maintenance worker informs to the MON CONT 7 that a CONV is added (step B2, SEND ADD-INF), in case the CONV is added. Then the MON CONT 7 issues a command to switch the constant output level control to constant gain control to the TX-UNIT OPT-AMP 6 and the REP OPT-AMP 81 and another command to raise optical output to the added CONV (step B3, SWITCH CONST-LEVEL-CONT TOCONST-GAIN-CONT, AND RAISE OUTPUT OF ADD-CONV).

When the optical output of the added CONV reaches the prescribed value, the MON CONT 7 issues a command to switch the constant gain control back to the constant level control to the TX-UNIT OPT-AMP 6 and the REP OPT-AMP 81 (step B4, SWITCH BACK TOCONST-LEVEL-CONT). As a result, the total optical output of the ELEC-OPT CONV 4, the TX-UNIT OPT-AMP 6 and the REPOPT-AMP 81 is set to a prescribed value corresponding to the number of the operating CONVs, respectively (step B5, OUTPUT OFELEC-OPT CONV, OPT-AMPs 6 and 81 ARE SET TO PRESCRIBED VALUE).

When a CONV is removed from the ELEC-OPT CONV 4 because of, for example, trouble or maintenance, the remove information is sent to the MON CONT 7 from a higher rank apparatus or by a maintenance worker (step B6, SEND REMOVE-INF). The MON CONT 7 issues a command to switch the constant output level control to the constant gain control to both the TX-UNIT OPT-AMP 6 and the REP OPT-AMP 81 and a command to decrease the optical output to the removed CONV (B7, SWITCH CONST-LEVEL-CONT TOCONST-GAIN-CONT AND DECREASE OUTPUT OF REMOVE-CONV). After the optical output of the removed CONV falls to a prescribed value, the MONT CONV 7 issues a command to switch the constant gain control back to the constant output level control to the TX-UNIT OPT-AMP 6 and the REP OPT-AMP 81. Or after a prescribed time passes, the control of the TX-UNIT OPT-AMP 6 and the REP OPT-AMP 81 may switch automatically the constant gain control back to the constant output level control (step B8, SWITCH BACK TO CONST-LEVEL-CONT). As a result of step B8, the operation of the removed CONV is completely stopped and the TX-UNIT OPT-AMP 6 and the REP OPT-AMP 81 produce the optical output of a prescribed value corresponding to the number of the operating CONVs excluding the removed CONV, under the constant output level control (step B9, REMOVE-CONV STOP AND OPT-AMPs 6 AND 81 PRODUCE OUTPUT CORRESPONDING TO THE NUMBER OF OPERATING CONVs UNDER CONST-LEVEL-CONT).

Figure 13:
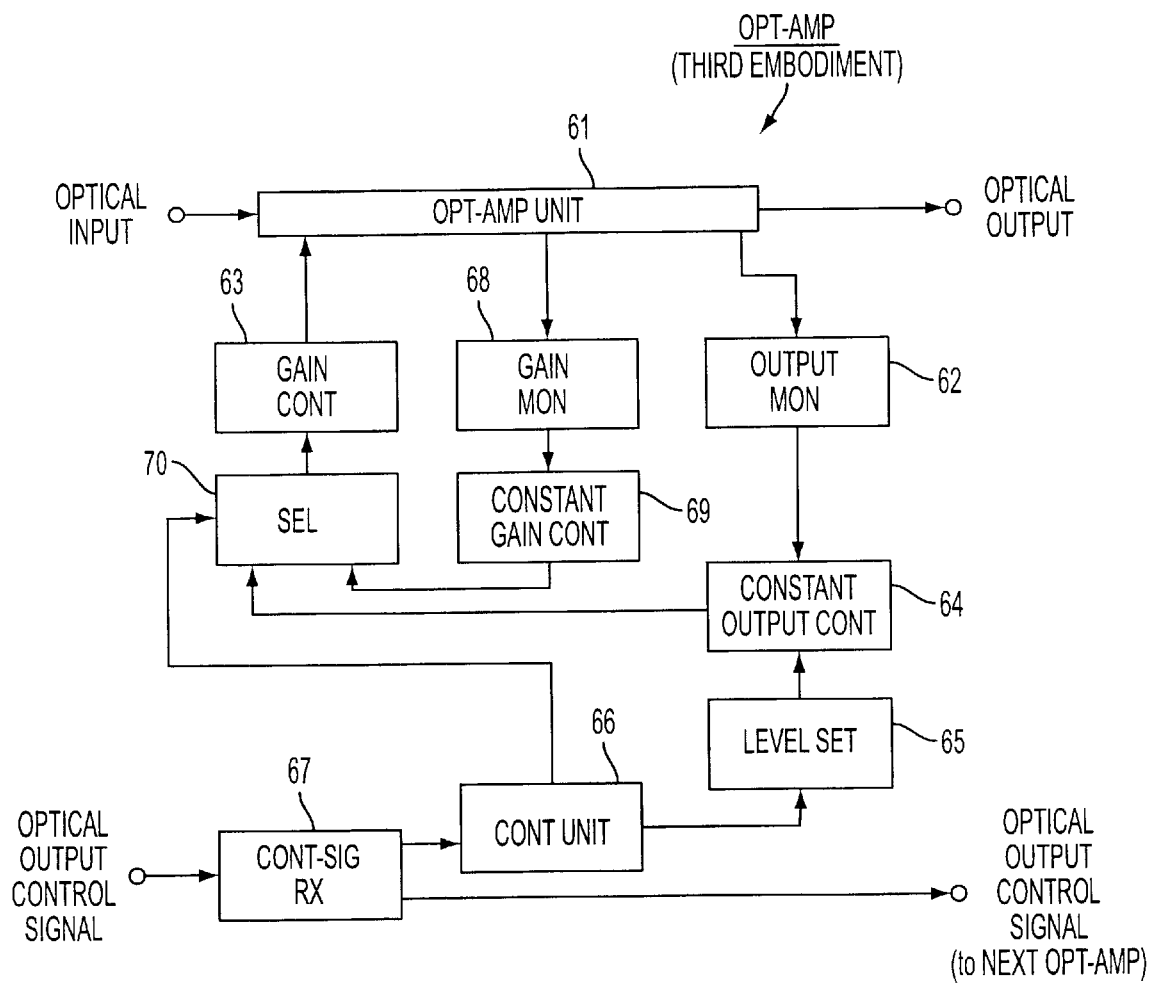
FIG. 13 is a block diagram of the transmitting unit optical amplifier or the repeater optical amplifier, in case of the third embodiment.

FIG. 13 is a block diagram of an optical amplifier used to the TX-UNIT OPE-AMP 6 and the REP OPT-AMP 81 in the multiplex optical communication system of the third embodiment of the present invention. The optical amplifier shown in FIG. 13 consists of an optical amplifier unit (OPT-AMP UNIT) (61), an optical output monitoring unit (OUTPUT MON) (62), a gain controlling unit (GAIN CONT) (63), a constant output level control circuit (CONSTANT OUTPUT CONT) (64), an output level setting unit (LEVEL SET) (65), a control unit (CONT UNIT) (66), a control signal receiving unit (CONT-SIG RX) (67), a gain monitoring unit (GAIN MON) (68), a constant gain control circuit (CONSTANT GAIN CONT) (69) and a selector (SEL) (70).

In case of the third embodiment, the same CONV as described in reference with FIG. 8 and the same MON CONT 7 as described in reference with FIG. 10 are used. In FIG. 13, the same reference symbol as in FIG. 9 designates the same unit or circuit as in FIG. 9, having the same function as in FIG. 9. Different from FIG. 9, the optical amplifier shown in FIG. 13 includes the GAIN MON 68, the CONSTANT GAIN CONT 69 and the SEL 70. The SEL 70 is controlled by the CONT UNIT 66 so that the SEL 70 usually selects the CONSTANT OUTPUT CONT 64 for controlling the OPT-AMP UNIT 61 by the GAIN CONT 63.

Upon receiving the optical output control signal from the CONT MON 7, the CONT-SIG RX 67 transfers the optical output control signal to the next optical amplifier (for example, the REP OPT-AMP 81) and the CONT UNIT 66. When the optical output control signal signifies that the CONV is added or removed, the optical output control signal controls the SEL 70 so that the SEL 70 selects the CONSTANT GAIN CONT 69 for connecting the CONSTANT GAIN CONT 69 with the GAIN CONT 63. As a result, control of the optical output from the OPT-AMP UNIT 61 is changed from the constant output level control to the constant gain control, so that the OPT-AMP UNIT 61 produces the optical output at an increasing rate of the output from the added CONV or an decreasing rate of the output from the removed CONV. That is, the OPT-AMP UNIT 61 produces the optical output by keeping the single optical output constant individually.

When a prescribed time determined by the rising time constant of the added CONV or the falling time constant of the removed CONV is passed, or when the output of the added CONV is in creased to a prescribed large value or the output of the removed CONV is decreased to a prescribed small value, the optical output control signal sends the above information to the optical amplifier. Upon receiving the information, in the optical amplifier, the CONT UNIT 66 controls the SEL 70 so that the SEL 70 selects the CONSTANT OUTPUT-LEVEL CONT 64 for connecting the CONSTANT OUTPUT-LEVEL CONT 64 with the GAIN CONT 63.

Figure 14:
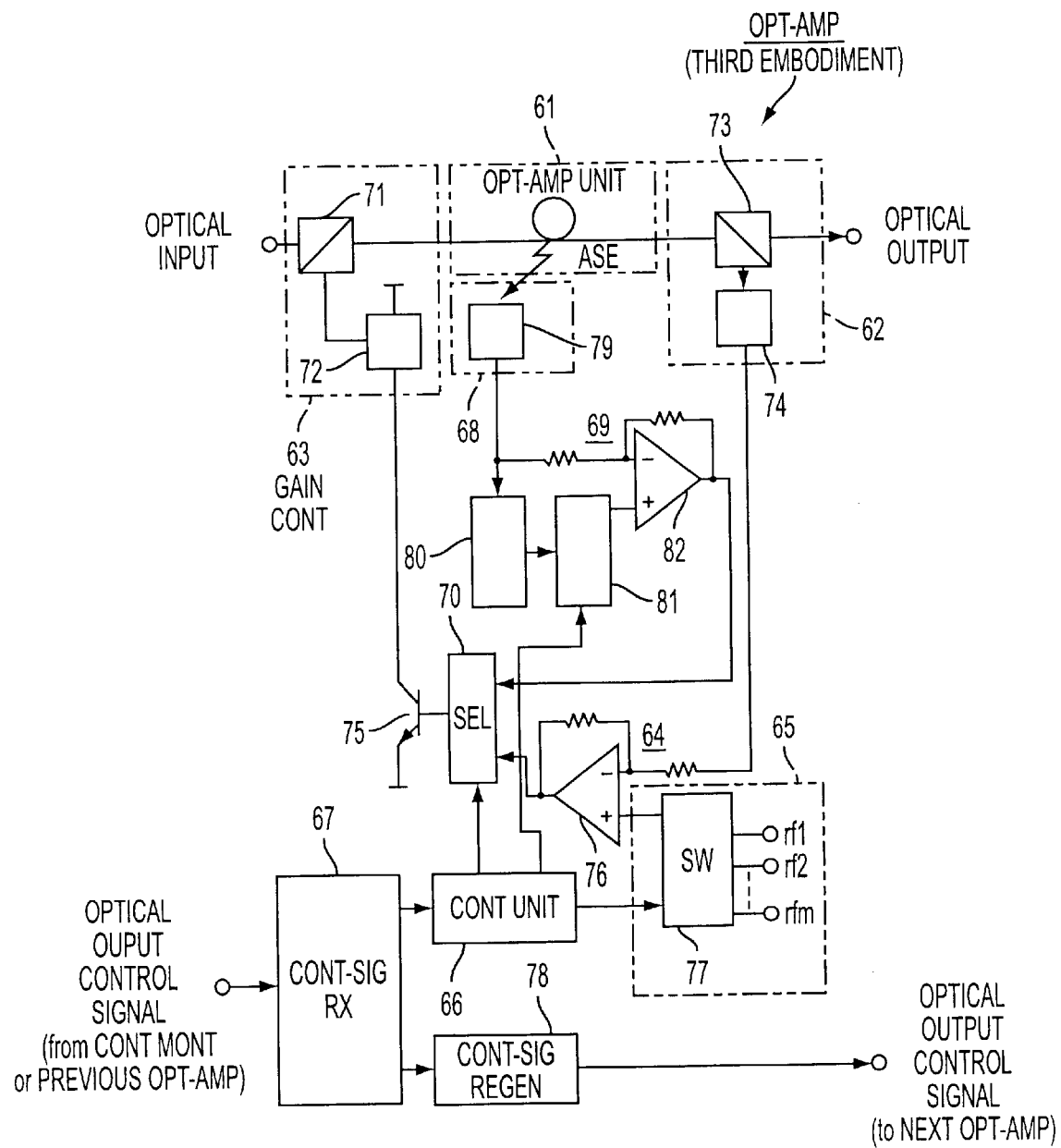
FIG. 14 is a block diagram of the transmitting unit optical amplifier or the repeater optical amplifier, in case of the third embodiment.

FIG. 14 is a block diagram for detailing the optical amplifier shown in FIG. 13. In FIG. 14, the same reference numeral as in FIG. 13 designates the same unit as in FIG. 13. In FIG. 14, symbol "ASE" in the OPT-AMP UNIT 61 is an abbreviation of "Amplified Spontaneous Emission" which will be described later, the OUTPUT MON 62 consists of an optical branch which will be simply called a "brancher" (73) and an optical detector (74), the GAIN CONT 63 consists of an optical combiner (71) and a pumping semiconductor laser (72), the GAINMON 68 includes an optical-to-electrical signal converter (79) using e.g. a photo diode, the LEVEL SET 65 includes a switching circuit (SW) (77), the CONSTANT OUTPUT LEVEL CONT 64 includes an operational amplifier (ope-amp) (76) and the CONSTANT GAIN CONT 69 consists of an averaging circuit (80), a holding circuit (81) and an ope-amp (82), and a transistor (75) is for connecting the GAINCONT 63 and the SEL 70.

When the CONT UNIT 66 receives the optical output control signal including information on starting the added CONV or stopping the removed CONV through the CONT-SIG RX 67, the CONT UNIT 66 controls the SEL 70 so that the CONSTANT OUTPUT LEVEL CONT 64 is switched to the CONSTANT GAIN CONT 69. As a result, a constant gain control loop is formed by connecting the transistor 75, the semiconductor laser 72, the optical combiner 71, the OPT-AMP UNIT 61, the GAIN MON 68 and the CONSTANT GAIN CONT 69. By virtue of the constant gain control loop, the OPT-AMP UNIT 61 can produce the optical output under the constant gain control.

In this case, the photo diode 79 in the GAIN MON 68 detects the ASE emitted from the Er doped optical fiber in the OPT-AMP UNIT61. This depends on a fact that the intensity of the ASE is directly proportional to the gain of the Er doped optical fiber. Since the ASE is emitted from a side of the Er doped optical fiber, the ASE can be detected by the photo diode 79 placed at the side of the Er doped optical fiber. (The details of the above is described in Japanese Patent TOKUKAIHEI 4-356984).

A detected signal from the photo diode 79 is sent to the averaging circuit 80 and averaged thereat, producing an averaged signal. The averaged signal is sent to the holding circuit 81 and held thereat until the constant gain control is switched to the constant output level control. The averaged signal held at the holding circuit 81 is sent to the ope-amp 82. The ope-amp 82 operates so that the detected signal from the photo diode 79 becomes always constant to the average signal sent from the holding circuit 81. This is performed by controlling the constant gain control loop. That is, the output from the ope-amp 82 controls the transistor 75 through the SEL 70 so that the pumping semiconductor laser 72 controls pumping optical power so as to keep the gain of the OPT-AMP UNIT 61 constant.

By virtue of the constant gain control described above, the optical output of the OPT-AMP UNIT 61 is increased or decreased in corresponding to increase or decrease of the optical input of the OPT-AMP UNIT 61. Therefore, the OPT-AMP UNIT 61 can produce the optical output so as to correspond to the increase or decrease of the output from the added or removed CONV respectively. As a result, it becomes possible to add or remove the CONV by keeping the single output of the OPT-AMP UNIT 61 constant, which results in decreasing the wave shape distortion of the optical signal and preventing the decrease of the SNR occurring.

The CONT UNIT 66 makes the SW 77 select one of the reference values rf1, rf2, - - - and rfm in corresponding to the number of the operating CONVs, and after a prescribed time passed or upon receiving the optical output control signal from the MON CONT 7, the CONT UNIT 66 controls the SEL 70 so that the connecting object of the ope-amp 76 is changed from the ope-amp 82 to the ope-amp 76. By virtue of changing the operational amplifier thus, the pumping semiconductor laser 72 is controlled so that under the constant output level control, the OPT-AMP UNIT 61 produces the optical output in accordance with the reference value set at the LEVEL SET 65.

Figure 15:
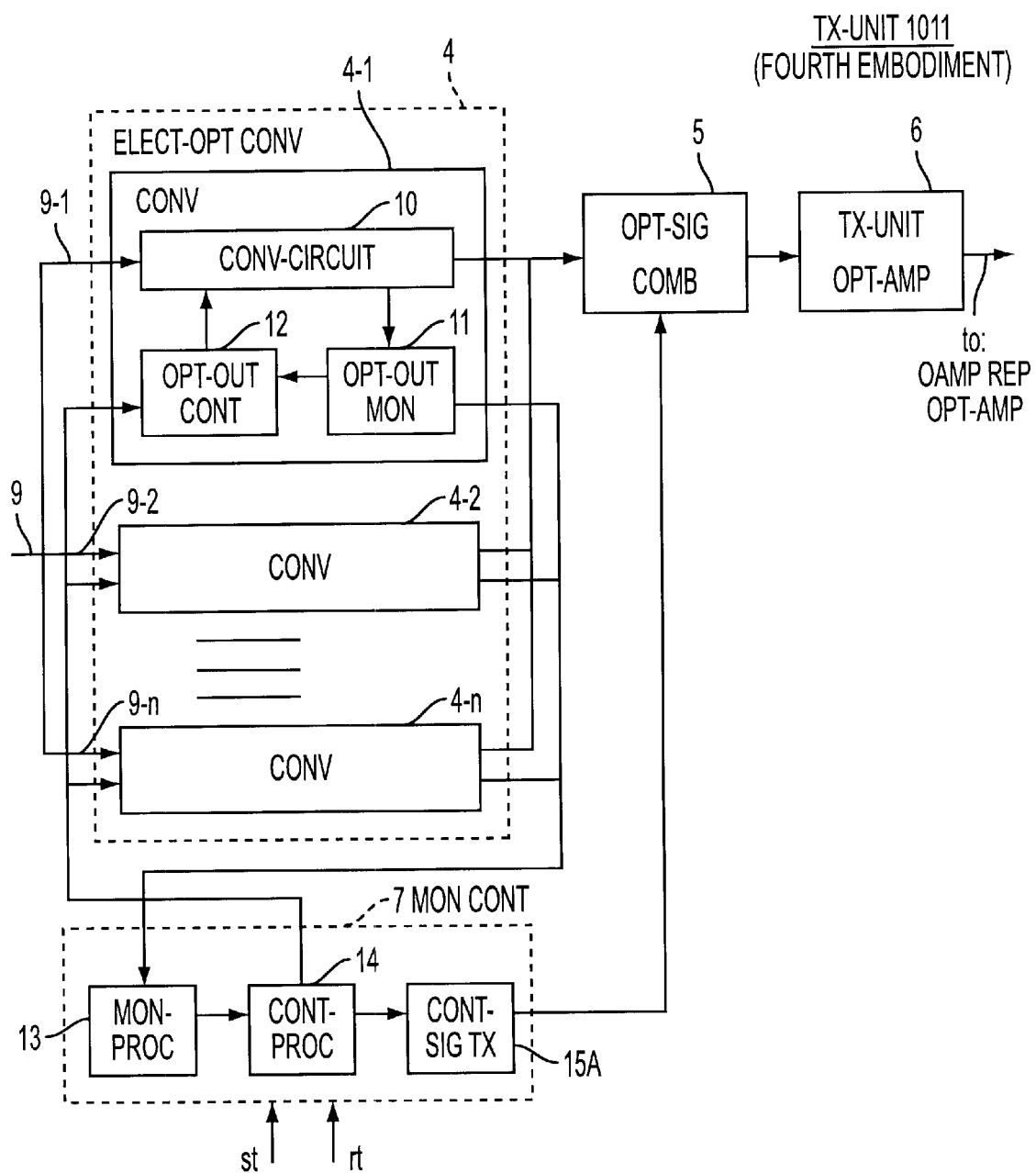
FIG. 15 is a block diagram of the transmitting unit in case of a fourth embodiment of the present invention.

FIG. 15 is a block diagram of multiplex optical communication system for illustrating a fourth embodiment of the present invention. In FIG. 15, the same reference numeral as in FIG. 3 designates the same unit as in FIG. 3. In FIG. 15, reference numeral 15A indicates a control-signal optical transmitter (CONT-SIG OPTICAL TX). The CONT-SIG OPTICAL TX 15A transmits an optical control signal including the optical output control signal and having a wavelength different from the wavelengths used in the CONVs 4-1 to 4-n incase of WDM. The optical control signal is sent to the OPT-SIG COMB 5 by an optical fiber depicted by a thick line in FIG. 15. The optical control signal is combined with other channel optical signals from the ELEC-OPT CONV 4 and sent to the TX-UNIT OPT-AMP and the REP OPT-AMP 81 through the optical fiber and the OPT-TRANS LINE 3. By virtue of using the optical signal, the electric line for transmitting the optical output control signal becomes unnecessary to be laid.

Figure 16:
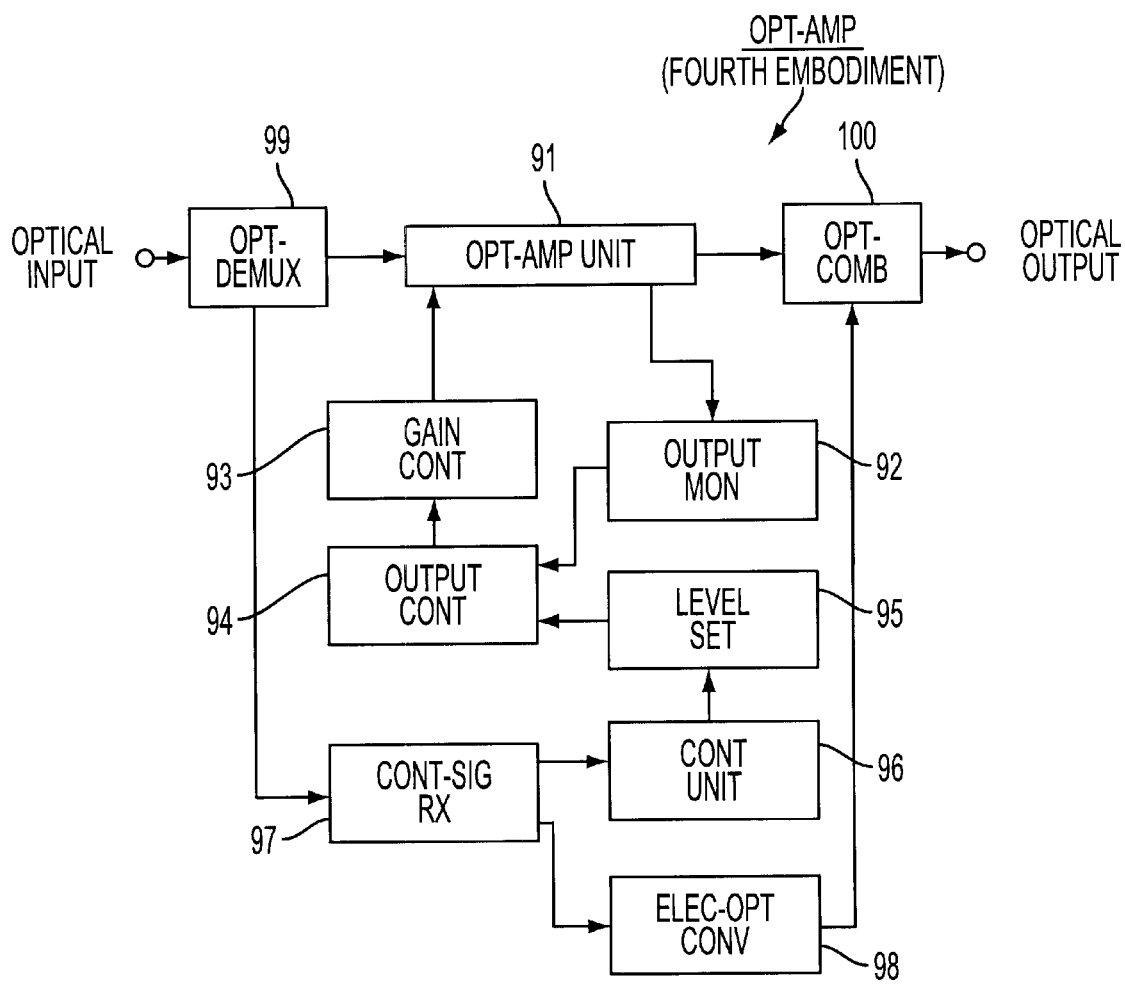
FIG. 16 is a block diagram of the transmitting unit optical amplifier or the repeater optical amplifier, in case of the fourth embodiment.

FIG. 16 is a block diagram for illustrating an optical amplifier used in the REP OPT-AMP 81 in case of the fourth embodiment. In FIG. 16, the same reference symbol as in FIG. 9 designates the same unit and has the same function as in FIG. 9. In FIG. 16, the optical amplifier consists of an OPT-AMP UNIT (91), an OUTPUT MON (92), a GAIN CONT (93), a CONSTANT OUTPUT CONT (94), a LEVELSET (95), a CONT UNIT (96), a CONT-SIG RX (97), an electro-optical converter (ELEC-OPT CONV) (98), an optical channel demultiplexer (OPT-DEMUX) (99) and an optical combiner (OPT-COMB) (100).

The optical amplifier for the fourth embodiment shown in FIG. 16 has the same constitution as the optical amplifier for the first embodiment shown in FIG. 9 except that the optical amplifier for the fourth embodiment includes the ELEC-OPT CONV 98, the OPT-DEMUX 99 and the OPT-COMB 100. Since the optical output control signal is sent from the MON CONT 7 to the optical amplifier in FIG. 16 through the OPT-TRANS LINE 3 as an optical signal, the optical signal including the optical output control signal is demultiplexed at the OPT-DEMUX 99 and sent to the CONT UNIT 97. The optical signal is converted to an electrical signal, which is the optical output control signal, at the CONT UNIT 97. The optical output control signal is again converted to an optical signal for transmitting to the REP OPT-AMP 81 in the next OAMP REP EQUIP 200. In the optical amplifier for the third embodiment described in reference with FIGS. 12 and 13, it is possible to transmit the optical output control signal to the REP OPT-AMP 81 as an optical signal through the OPT-TRANS LINE 3 and convert the optical signal including the optical output control signal to the electrical signal at the optical amplifier for the third embodiment.

Figure 17A:
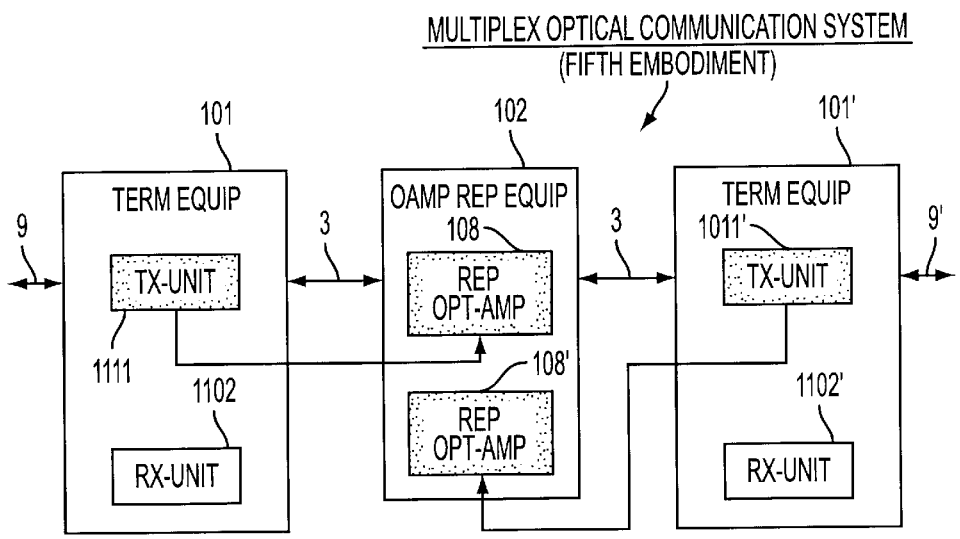
FIG. 17A is a block diagram of the multiplex optical communication system of a fifth embodiment of the present invention.
Figure 17B:
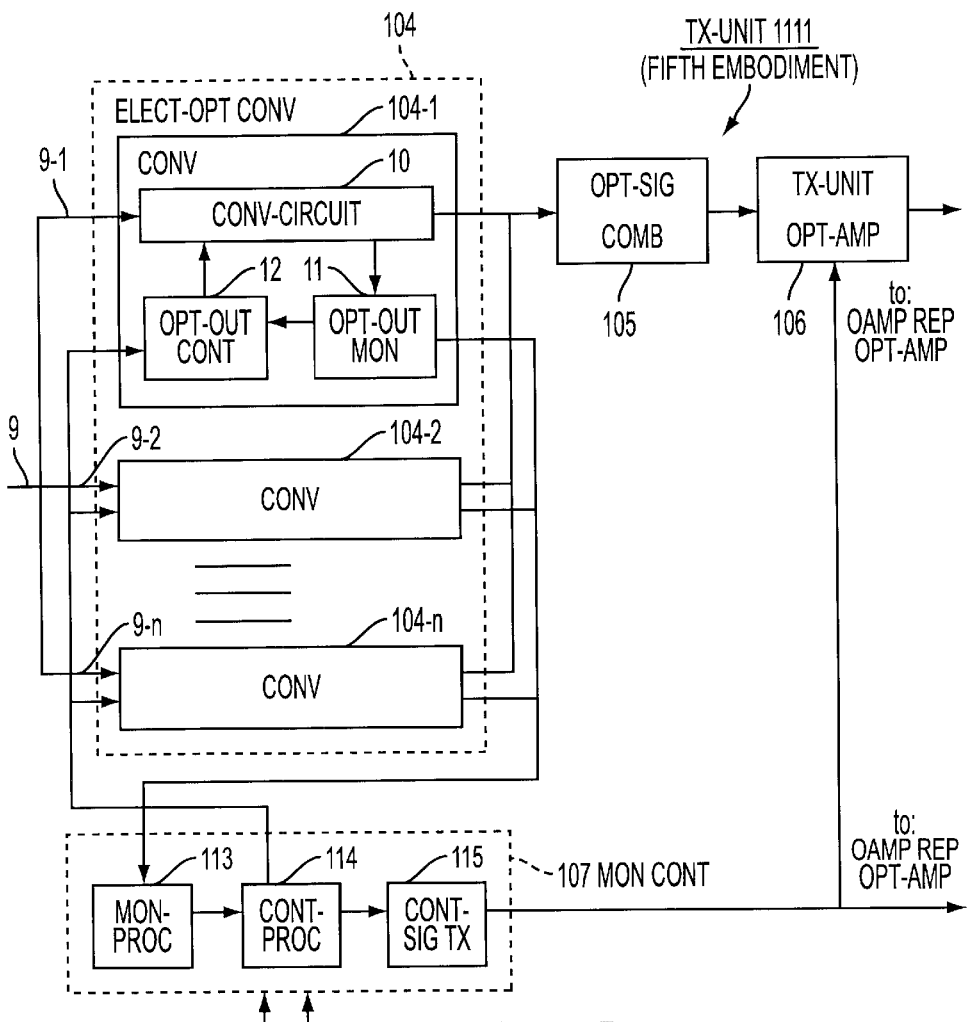
FIG. 17B is a block diagram of a transmitting unit in the multiplex optical communication system of the fifth embodiment.
Figure 17C:
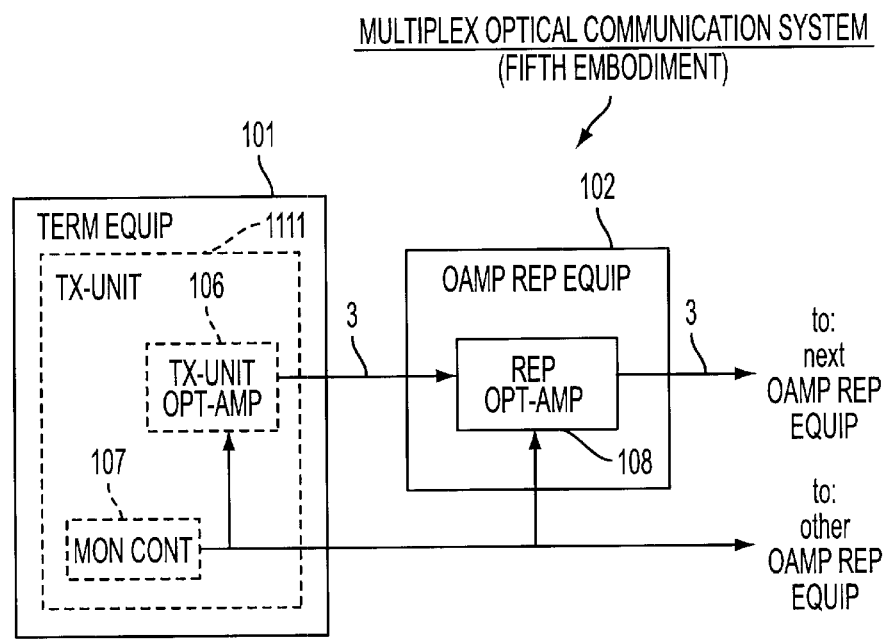
FIG. 17C is a block diagram of the optical amplifier repeater equipment in the multiplex optical communication system of the fifth embodiment, illustrating a connected state with the transmitting unit.

FIGS. 17A, 17B and 17C are block diagrams for illustrating a multiplex optical communication system of a fifth embodiment of the present invention. Different from the multiplex optical communication system of the first embodiment operating under the WDM, the multiplex optical communication system of the fifth embodiment operates under the OTDM. In FIGS. 17A, 17B and 17C, the same reference symbol as in FIGS. 2, 3 and 4 designates substantially the same unit as in FIGS. 2, 3 and 4, and the same reference numeral as in FIG. 3 designates the same object as in FIGS. 2, 3 and 4. In FIGS. 17A, 17B and 17C, the multiplex optical communication system principally consists of two TERM EQUIP (101 and 101'), a plurality of OAMP REP EQUIP (102) and the OPT-TRANS LINE 3. The TERMEQUIP 101 includes a TX-UNIT (1111) which consists of an ELECT-OPT CONV (104), an OPT-SIG COMB (105), a TX-UNIT OPT-AMP (106) and a MON CONT (107) and an RX-UNIT (1102). The ELECT-OPT CONV 104 consists of CONVs 104-1, 104-2, - - - and 104-n, and each CONV consists of a CONV-CIRCUIT (110), an OPT-OUT MON (111) and OPT-OUT CONT (112). The MON CONT 107 consists of a MON-PROC (113), a CONT-PROC (114) and a CONT-SIG TX (115). The OAMP REP EQUIP 102 includes REP OPT-AMPs (108 and 108').

The CONVs 104-1 to 104-n transmit optical signals in accordance with electrical signals or data sent through the ELEC-SIG CHANNELLINES 9, at the same wavelength, however, different time slot each other. The OPT-SIG COMB 105 multiplys the optical signals sent from the CONVs 104-1 to 104-n in time-divisional and produces optical output as an OTDM signal. Control of the time slots to the CONVs 104-1 to 104-n is performed by the CONT-PROC 114 in the MON CONT 107.

Figure 18:
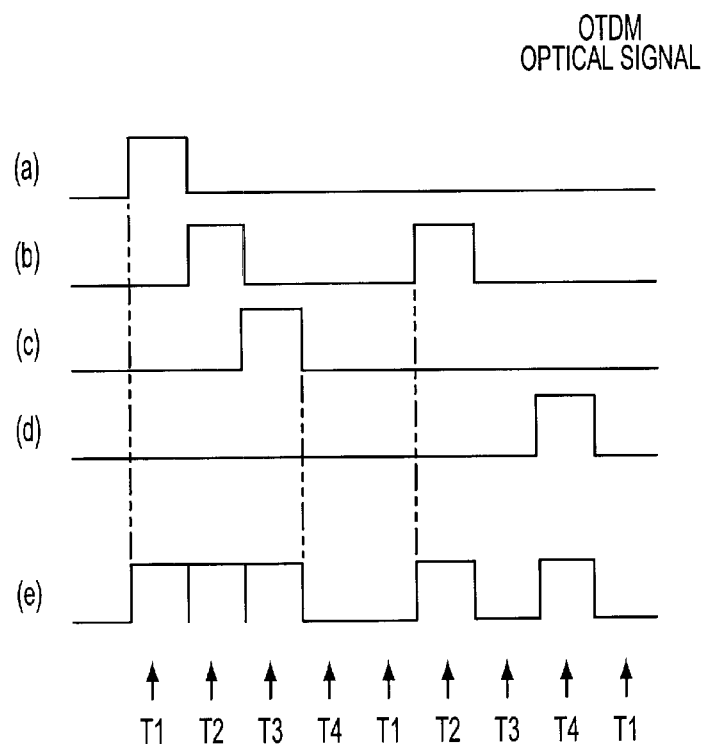
FIG. 18 is wave forms illustrating a multiplex optical signal in case of Optical Time Division Multiplexing.

The TX-UNIT OPT-AMP 106 and the REP OPT-AMP 108 amplify the OTDM signal under the time constant control system described in the first embodiment and the control manner change system described in the third embodiment. That is, the optical amplification at the TX-UNIT OPT-AMP 106 and the REP OPT-AMP 108 can be perform by making the rising or falling time constant of the TX-UNITOPT-AMP 106 and the REP OPT-AMP 108 equal to the rising or falling time constant of the added or removed CONV respectively, or the optical amplification can be performed by switching the control manner as follows: before a CONV is added or removed, the optical amplification is performed under the constant output level control as usually performed in the prior art; when a CONV is added and starts to operate, the optical amplification is performed under the constant gain control until the optical output of the added CONV reaches a prescribed value, and when a CONV is removed and stops operation, the optical amplification is performed under the constant gain control until the optical output of the removed CONV is decreased to zero value or a prescribed value near to zero; and when the optical output of the added CONV is raised to the prescribed value, the optical amplification is performed by the constant output level control, and when the optical output of the removed CONV is decreased to zero value or the prescribed value near to zero value, the optical amplification is performed under the constant output level control. FIG. 18 is illustration of OTDM. For instance, four CONVs 104-1, 104-2, 104-3 and 104-4 produce optical output at time slots T1, T2, T3 and T4 as shown by 1-0 signals (a), (b), (c) and (d) in FIG. 18, respectively. Upon receiving four optical output from the CONVs 104-1, 104-2, 104-3 and 104-4, the OPT-SIG COMB 105 performs multiplex to the four optical output and produces an OTDM datum as shown by (e) in FIG. 18. Control for making the CONVs 104-1, 104-2, 104-3 and 104-4 correspond with the time slots T1, T2, T3 and T4 can be performed by using an ordinal method used in usual OTDM system.

The present invention can be applied to other multiplex optical communication system employing TDM-OTDM combination system for increasing multiplex factor and operation efficiency of the multiplex optical communication system.

What is claimed is:

1. A system, comprising:
    a terminal which transmits, to an optical fiber transmission line, an optical signal including a plurality of second optical signals with different wavelengths and a supervisory optical signal, by which condition of the optical signal is notified, with wavelength different from the second optical signals; and,
    an optical amplifier including:
        an amplifying unit which receives the optical signal and the supervisory optical signal from the optical fiber transmission line and amplifies the optical signal; and,
        a controller which detects the supervisory optical signal and has a first mode in which the amplifying unit is controlled to amplify the optical signal with an approximately constant gain and a second mode in which the amplifying units is controlled to output the amplified optical signal with a predetermined level, the controller switchable between the first mode and the second mode in response to the supervisory optical signal.

2. A system according to claim 1, wherein
    a variation of a number of the second optical signals is notified by the supervisory optical signal, and
    the controller is switchable to the first mode in response to the supervisory optical signal.

3. A system according to claim 1, wherein
    steady state of a number of the second optical signals is notified by the supervisory optical signal, and
    the controller is switchable to the second mode in response to the supervisory optical signal.

4. A system according to claim 1, wherein, in the first mode,
    the amplifying unit is controlled to output each second optical signal with respective predetermined levels.

5. A system, comprising:
    first means for transmitting, to an optical fiber transmission line, an optical signal including a plurality of second optical signals with different wavelengths and a supervisory optical signal, by which condition of the optical signal is notified, with wavelength different from the second optical signals;
    second means for receiving the optical signal and the supervisory optical signal from the optical fiber transmission line and amplifying the optical signal; and,
    third means for detecting the supervisory optical signal and for switching, in response to the supervisory optical signal, between a first mode in which the second means is controlled to amplify the optical signal with an approximately constant gain and a second mode in which the second means is controlled to output the amplified optical signal with a predetermined level.

6. A system according to claim 5, wherein
    a variation of a number of the second optical signals is notified by the supervisory optical signal, and
    the third means is switched to the first mode in response to the supervisory optical signal.

7. A system according to claim 4, wherein
    steady state of a number of the second optical signals is notified by the supervisory optical signal, and
    the third means is switched to the second mode in response to the supervisory optical signal.

8. A system according to claim 5, wherein, in the first mode,
    the second means is controlled to output each second optical signal with respective predetermined levels.

9. An optical transmission system, comprising:
    a terminal station which transmits, to an optical fiber transmission line, an optical signal including a plurality of second optical signals with different wavelengths and a supervisory optical signal, by which condition of the optical signal is notified, with wavelength different from the second optical signals;
    an optical amplifier which, optically coupled to the optical fiber transmission line, receives the optical signal and amplifies the optical signal; and,
    a controller, receiving the supervisory optical signal from the optical fiber transmission line, operatively coupled to the optical amplifier and switched, in response to the supervisory optical signal, between a first mode in which the optical amplifier is controlled to amplify the optical signal with an approximately constant gain and a second mode in which the optical amplifier is controlled to output the amplified optical signal with a predetermined level.

10. An optical transmission system according to claim 9, wherein
    a variation of a number of the second optical signals is notified by the supervisory optical signal, and
    the controller is switched to the first mode in response to the supervisory optical signal.

11. An optical transmission system according to claim 9, wherein
    steady state of a number of the second optical signals is notified by the supervisory optical signal, and
    the controller is switched to the second mode in response to the supervisory optical signal.

12. An optical transmission system according to claim 9, wherein, in the first mode,
    the optical amplifier is controlled to output each second optical signal with respective predetermined levels.

13. A system, comprising:
    a terminal which transmits, to an optical fiber transmission line, an optical signal including a plurality of second optical signals with different wavelengths and a supervisory optical signal, by which condition of the optical signal is notified, with wavelength different from the second optical signals; and,
    an optical amplifier including:
        an amplifying unit which receives the optical signal and the supervisory optical signal from the optical fiber transmission line and amplifies the optical signal; and,
        a controller which detects the supervisory optical signal and has a first mode in which the amplifying unit is controlled to output the amplified second optical signals with respective predetermined levels and a second mode in which the amplifying units is controlled to output the amplified optical signal with a predetermined level, the controller switchable between the first mode and the second mode in response to the supervisory optical signal.

14. A system according to claim 13, wherein a variation of a number of the second optical signals is notified by the supervisory optical signal, and the controller is switchable to the first mode in response to the supervisory optical signal.

15. A system according to claim 13, wherein steady state of a number of the second optical signals is notified by the supervisory optical signal, and the controller is switchable to the second mode in response to the supervisory optical signal.

16. A system, comprising:

first means for transmitting, to an optical fiber transmission line, an optical signal including a plurality of second optical signals with different wavelengths and a supervisory optical signal, by which condition of the optical signal is notified, with wavelength different from the second optical signals;

second means for receiving the optical signal and the supervisory optical signal from the optical fiber transmission line and amplifying the optical signal; and, third means for detecting the supervisory optical signal and for switching, in response to the supervisory optical signal, between a first mode in which the second means is controlled to output the amplified second optical signals with respective predetermined levels and a second mode in which the second means is controlled to output the amplified optical signal with a predetermined level.

17. A system according to claim 16, wherein a variation of a number of the second optical signals is notified by the supervisory optical signal, and the third means is switched to the first mode in response to the supervisory optical signal.

18. A system according to claim 16, wherein steady state of a number of the second optical signals is notified by the supervisory optical signal, and the third means is switched to the second mode in response to the supervisory optical signal.

19. An optical transmission system, comprising:

a terminal station which transmits, to an optical fiber transmission line, an optical signal including a plurality of second optical signals with different wavelengths and a supervisory optical signal, by which condition of the optical signal is notified, with wavelength different from the second optical signals;

an optical amplifier which, optically coupled to the optical fiber transmission line, receives the optical signal and amplifies the optical signal; and, a controller, receiving the supervisory optical signal from the optical fiber transmission line, operatively coupled to the optical amplifier and switched, in response to the supervisory optical signal, between a first mode in which the optical amplifier is controlled to output the amplified second optical signals with respective predetermined levels and a second mode in which the optical amplifier is controlled to output the amplified optical signal with a predetermined level.

20. An optical transmission system according to claim 19, wherein a variation of a number of the second optical signals is notified by the supervisory optical signal, and the controller is switched to the first mode in response to the supervisory optical signal.

21. An optical transmission system according to claim 19, wherein steady state of a number of the second optical signals is notified by the supervisory optical signal, and the controller is switched to the second mode in response to the supervisory optical signal.

* * * * *